(12) United States Patent
McDaniel et al.

(10) Patent No.: US 8,161,197 B2
(45) Date of Patent: Apr. 17, 2012

(54) METHOD AND SYSTEM FOR EFFICIENT BUFFER MANAGEMENT FOR LAYER 2 (L2) THROUGH LAYER 5 (L5) NETWORK INTERFACE CONTROLLER APPLICATIONS

(75) Inventors: Scott McDaniel, Villa Park, CA (US); Kan Fan, Diamond Bar, CA (US)

(73) Assignee: Broadcom Corporation, Irvine, CA (US)

( * ) Notice: Subject to any disclaimer, the term of this patent is extended or adjusted under 35 U.S.C. 154(b) by 1564 days.

(21) Appl. No.: 10/971,186

(22) Filed: Oct. 22, 2004

(65) Prior Publication Data

US 2005/0138161 A1    Jun. 23, 2005

Related U.S. Application Data

(60) Provisional application No. 60/531,472, filed on Dec. 19, 2003.

(51) Int. Cl.
*G06F 15/16* (2006.01)
(52) U.S. Cl. ........... 709/250; 710/52; 710/53; 710/54; 710/55; 710/56; 711/6
(58) Field of Classification Search .......... 709/234, 709/250; 710/52–57, 100, 105–106, 305–312; 711/3, 6, 100, 108, 117–120, 130–131, 136–137, 711/144–145, 159–160, 200, 205–209
See application file for complete search history.

(56) References Cited

U.S. PATENT DOCUMENTS

| | | | |
|---|---|---|---|
| 4,458,316 A * | 7/1984 | Fry et al. ........................ 710/52 |
| 4,727,538 A * | 2/1988 | Furchtgott et al. ............ 370/431 |
| 5,638,538 A * | 6/1997 | VanDoren et al. ............... 710/1 |
| 5,664,116 A * | 9/1997 | Gaytan et al. ................ 709/234 |
| 5,751,951 A * | 5/1998 | Osborne et al. .............. 709/250 |
| 5,857,075 A * | 1/1999 | Chung .......................... 709/223 |
| 5,978,951 A * | 11/1999 | Lawler et al. ................. 714/758 |
| 6,104,713 A * | 8/2000 | Nagami et al. ............... 370/392 |
| 6,226,680 B1 * | 5/2001 | Boucher et al. .............. 709/230 |
| 6,651,117 B1 * | 11/2003 | Wilson et al. ................... 710/33 |
| 6,678,283 B1 * | 1/2004 | Teplitsky ..................... 370/463 |
| 6,731,097 B1 * | 5/2004 | Richards et al. ........... 370/395.6 |
| 6,754,773 B2 * | 6/2004 | Ulrich et al. .................. 711/118 |
| 7,080,128 B2 * | 7/2006 | Sakaguchi ................... 709/213 |
| 7,185,147 B2 * | 2/2007 | Illikkal et al. ................ 711/118 |
| 7,307,998 B1 * | 12/2007 | Wang et al. .................. 370/412 |
| 7,562,366 B2 * | 7/2009 | Pope et al. .................... 719/314 |
| 2001/0037406 A1 * | 11/2001 | Philbrick et al. ............. 709/250 |
| 2002/0012585 A1 * | 1/2002 | Kalkunte et al. ............. 415/137 |

(Continued)

*Primary Examiner* — Asad M Nawaz
*Assistant Examiner* — Sarah Drabik
(74) *Attorney, Agent, or Firm* — Thomas, Kayden, Horstemeyer & Risley, LLP

(57) ABSTRACT

Method and system for efficient buffer management for layer 2 through layer 5 network interface controller applications are provided. Aspects of the method may comprise determining whether an active NIC connection is an L2 type, an L4 type, or an L5 type. At least one buffer descriptor may be cached locally on a network interface controller (NIC) managed by a NIC application. The buffer descriptor is associated with the determined type of the active NIC connection. If the at least one active NIC connection is of the L2 or L4 type, the buffer descriptor may comprise at least one of a receive (RX) buffer descriptor and a transmit (TX) buffer descriptor. If the NIC connection is of the L5 type, the buffer descriptor may comprise at least one of a upper translation page table (TPT) entry and a lower TPT entry.

41 Claims, 13 Drawing Sheets

U.S. PATENT DOCUMENTS

| | | | |
|---|---|---|---|
| 2002/0091844 A1* | 7/2002 | Craft et al. | 709/230 |
| 2002/0147839 A1* | 10/2002 | Boucher et al. | 709/238 |
| 2004/0064578 A1* | 4/2004 | Boucher et al. | 709/236 |
| 2004/0156393 A1* | 8/2004 | Gupta et al. | 370/469 |
| 2005/0080923 A1* | 4/2005 | Elzur | 709/238 |
| 2005/0105531 A1* | 5/2005 | Zur et al. | 370/395.5 |
| 2005/0177657 A1* | 8/2005 | Pope et al. | 710/36 |
| 2006/0075119 A1* | 4/2006 | Hussain et al. | 709/227 |
| 2009/0070504 A1* | 3/2009 | Kostadinov | 710/105 |

* cited by examiner

METHOD AND SYSTEM FOR EFFICIENT BUFFER MANAGEMENT FOR LAYER 2 (L2) THROUGH LAYER 5 (L5) NETWORK INTERFACE CONTROLLER APPLICATIONS

CROSS-REFERENCE TO RELATED APPLICATIONS/INCORPORATION BY REFERENCE

This application makes reference to, claims priority to, and claims the benefit of: U.S. Provisional Application Ser. No. 60/531,472, filed Dec. 19, 2003 and entitled "Method And System For Efficient Buffer Management For Layer 2 Through Layer 5 Network Interface Card Applications."

The above stated application is incorporated herein by reference in its entirety.

FIELD OF THE INVENTION

Certain embodiments of the invention relate to the processing of packetized data. More specifically, certain embodiments of the invention relate to a method and system for efficient buffer management for layer 2 (L2) through layer 5 (L5) network interface controller (NIC) applications.

BACKGROUND OF THE INVENTION

The International Standards Organization (ISO) has established the Open Systems Interconnection (OSI) Reference Model. The OSI Reference Model provides a network design framework allowing equipment from different vendors to be able to communicate. More specifically, the OSI Reference Model organizes the communication process into seven separate and distinct, interrelated categories in a layered sequence. Layer 1 is the Physical Layer. It deals with the physical means of sending data. Layer 2 is the Data Link Layer. It is associated with procedures and protocols for operating the communications lines, including the detection and correction of message errors. Layer 3 is the Network Layer. It determines how data is transferred between computers. Layer 4 is the Transport Layer. It defines the rules for information exchange and manages end-to-end delivery of information within and between networks, including error recovery and flow control. Layer 5 is the Session Layer. It deals with dialog management and controlling the use of the basic communications facility provided by Layer 4. Layer 6 is the Presentation Layer. It is associated with data formatting, code conversion and compression and decompression. Layer 7 is the Applications Layer. It addresses functions associated with particular applications services, such as file transfer, remote file access and virtual terminals.

FIG. 1A is a block diagram illustrating an exemplary conventional L5 command sequence. The L5 level allows the transfer of application buffers between different applications, which is known as a dialog. Referring to FIG. 1A, an exemplary L5 command sequence may be to move N bytes of memory 11 starting at virtual address A of system 1 to system 2 via the network 10. The n bytes of memory 11 may occupy N bytes of memory 12 starting at virtual address B at system 2. An indication that this task is complete may also be requested from system 1.

FIG. 1B is a block diagram illustrating L1 through L5 processing of the conventional L5 command of FIG. 1A. Referring to FIG. 1B, the left column illustrates protocol layer sequences 17, 19, 21, 23, and 25 for protocol layers L5, L4, L3, L2 and L1, respectively, whereas the right column provides a pictorial view of the data as it processed and prepared for transmission. The first step 15 illustrates the conventional L5 command of FIG. 1A to move a specific piece of host virtual memory (1) to a specific location in another host. The L5 processing encodes the data about the request into a header (2a) and trailer (2b) for the L5 data. The header and trailer may be allocated as new virtual memory areas and may be passed as three or more separate send requests to the L4 layer.

The L4 processing layer may segment the send requests to fit within limitations of the lower layers. It then allocates additional virtual memory areas for individual L4 headers (3) for each segment. Each header, along with the virtual memory pieces needed to complete the segment, is passed down to the L3 layer. In our example, three packets of data are passed down, the first having three virtual memory areas, the second having two virtual memory areas, and the third having three virtual memory areas.

The L3 processing layer allocates yet another virtual memory space for each packet and formats the L3 headers (4), and normally the L2 header for Ethernet packets, into the virtual memory areas. Each group is now passed down to the L2 processing layer. The L2 processing layer may collect the data from the received virtual memory areas and may produce a continuous data stream. Encapsulation for packets may be required at the L2 processing level, as well as guaranteed inter-packet gap (IPG) time. The L2 processing converts the packets received from the L3 processing level into a continuous data stream 28, which may be communicated to the L1 processing level. The L1 processing level coverts the continuous data stream 28 received from the L2 processing into the appropriate electrical or optical signal pulses to travel on the network media.

In conventional communication systems that process packetized data, various different NIC technologies have been implemented in different chips, with each chip adapted to process a particular layer. In this regard, specific chips have been developed to handle L2 processing, specific chips have been developed for L4 offload processing, and specific chips have been developed to handle L5 offload processing.

FIG. 1C is a block diagram of conventional virtual memory system for mapping physical memory. Referring to FIG. 1C, the physical system memory 31 is broken into equal sized $2^{\wedge\wedge}N$ sized memory pages. These pages may comprise the physical memory allocation units for the system. As memory is allocated to an application, the lower translation page table (TPT) 35 is built to list the physical memory pages currently allocated to the application. The application may also be characterized by an upper TPT entry 33 that may point to the lower TPT entry 35.

Access to a particular virtual memory location, at a specific virtual address, by the application is mapped by first finding the upper TPT entry 33 for the application or buffer (step 1). This upper TPT entry 33 may contain a pointer to the start of the lower TPT entry 35 (step 2). The upper TPT entry 33 may also specify a fixed virtual offset or virtual base to subtract from virtual address before further processing. An index into the lower TPT entry may be determined from the upper bits of the virtual address. This is possible because the pages sizes are consistent and of $2^{\wedge\wedge}N$ size (step 3). Once the lower TPT entry is determined, its value may point to the start of one of the physical memory pages (step 4). The lower bits that are not used in determining the lower TPT entry index position may be utilized to index into the selected physical page to determine the physical address of the desired data (step 5). Accesses to the complete virtual address space of the buffer may be mapped. In this way, a completed virtual memory view 37 may be generated.

While page based virtual memory systems are common in general purpose computer systems, more customized systems, such as storage severs, may utilize a block organization system. FIG. 1D is a block diagram of conventional block organization system for mapping physical memory. Referring to FIG. 1D, the block organization system is similar to the virtual memory page system of FIG. 1C, except that basic allocation unit may be any consistent size for a particular task.

Access to a particular location in the physical memory 41 for a task is mapped by first finding the task entry in the task list 43 (step 1). The task entry may contain a pointer to the start of the task block list 45 (step 2). The task entry may also specify a specific amount of the first block that is not included in the task, for example, the first block offset. The first block offset may be added to the original location. An index into the block list may be determined by dividing the address by the block size. The division result will be the index into the block list 45 (step 3). The value from the task block list 45 may determine the start of the physical block to be accessed within the physical system memory 41 (step 4). The remainder of the division may provide the index into the selected block to finally determine the physical address of the desired data (step 5). Accesses to the complete block system space of the buffer may be mapped. In this way, a completed block system memory view 47 may be generated.

FIG. 1E is a block diagram illustrating conventional L2 processing on a NIC. The NIC 103 is connected to a host memory 101 via an interface bus 105. Referring to FIG. 1, the NIC 103 may comprise a receive (RX) data engine 119, an on-chip RX buffer descriptor pre-read memory 121, a transmit (TX) data engine 115 and an on-chip TX buffer descriptor pre-read memory 117. The host memory 101 may comprise TX buffers 107, RX buffers 109, a TX buffer descriptor queue 111 and a RX buffer descriptor queue 113. Network data may be communicated with the NIC via the transmit flow 123 and the receive flow 125.

For L2 processing, the basic requirement is to transmit from an endless stream of host physical address TX buffers 107, each with variable length. Data may be received into an endless, constantly replenished stream of host physical address RX buffers 109. During each of the transmit and receive cycles, one packet may go into one or more of the sequential TX buffers 107 and the RX buffers 109, respectively. Since there is only one transmit flow 123 and one receive flow 125, normal practice is to simply read ahead the TX buffer descriptor queue 111 and the RX buffer descriptor queue 113 for the physical address spaces. Data packets may then be transmitted, or received, based on the availability of network bandwidth. All addressing information for the buffers may already be residing on chip. Some times more than one stream is supported in either or both directions, but the number of streams during L2 processing is normally limited to 16 or less.

L2 devices are normally the most competitively priced networking devices on the market. The cost of an L2 device implementation is that application software, or the host based drivers, must do extensive formatting, segmentation, and re-assembly of network traffic to create/process complete L2 packet streams This consumes expensive host CPU bandwidth and host memory bandwidth. An important feature of the L2 on-chip RX buffer pre-read memory 121 is that it is filled with each new buffer descriptor entry from the RX buffer descriptor queue 113 only once. Similarly, the on-chip TX buffer pre-read memory 117 is filled with each new buffer descriptor entry from the TX buffer descriptor queue 111 only once.

Data from the receive flow 125 is initially stored in the RX data engine 119. It may then be distributed in the host RX buffers 109 using RX buffer descriptor queue information stored on the on-chip RX buffer descriptor pre-read memory 121. Data in the transmit flow 123 is moved from the host TX buffers 107 into the TX data engine 115 using TX buffer descriptor queue information stored on the on-chip TX buffer descriptor pre-read memory 117. The buffer descriptor entries will stay on the NIC 103 in the dedicated pre-read memories 117 and 121 until the buffer pointed to by the corresponding descriptor is emptied (during a TX operation) or filled (during a RX operation). Once the buffer descriptor is consumed, the on-chip memory (121 or 117) may be reused for a new buffer descriptor from its corresponding queue.

L2 processing has traditionally been achieved by having a driver running on the main system processor converting virtual memory areas into a list of physical memory address/length pairs. In this regard, the TX buffer descriptor queue comprises physical memory information. The buffers 107 pointed to by each physical address/length pair are portions of the virtual memory areas generated by the higher level network stacks. For L2 offload level, the TX buffer descriptor queue 111 may be read by the NIC into the on-chip TX buffer pre-read memory 117 and fed to the TX data engine 115. Final L2 formatting is achieved as the data is communicated out from the TX data engine 123.

FIG. 2 is a block diagram illustrating conventional L4 processing. The NIC 203 is connected to a host memory 201 via an interface bus 205. Referring to FIG. 2, the NIC 203 may comprise a RX data engine 219 and a TX data engine 215. The NIC may be connected to an off-chip RX buffer descriptor pre-read memory 221, and an off-chip TX buffer descriptor pre-read memory 217. The host memory 201 may comprise a set of TX buffers 207, RX buffers 209, a TX buffer descriptor queue 211 and a RX buffer descriptor queue 213, all associated with a specific L4 connection being processed by the NIC. Many 1000's of these connections may need to be processed by the NIC. Data may be communicated with the NIC via the transmit flow 223 and the receive flow 225.

There are different implementations for L4 offload buffer management processing. One implementation for L4 buffer management processing is where each connection supported requires a pair of transmit/receive buffer streams. During a transmit and a receive operation, host physical buffers of variable length may be used, for example, the TX buffers 207 and the RX buffers 209 on the host memory 201. Buffer descriptor information is stored in the TX buffer descriptor queue 211 and the RX buffer descriptor queue 213. During L4 processing, the NIC 203 and the host memory 201 may support many data connections. For example, the number of TX buffer descriptor queues and RX buffer descriptor queues that may be managed is normally counted in the 1000's, with some L4 devices supporting 64K queues and more. Compared to the market for L2 types of devices, the market for L4 types of devices has been less price competitive. With regard to data processing, the L4 types of devices simply pre-read the buffers, just as the L2 types of device did. However, one TX/RX buffer set is required for each connection during L4 processing. This requires large amounts of memory for storage on the NIC, normally requiring multiple external memory devices to implement (i.e. external memory attached to the NIC). For example, an off-chip TX buffer descriptor pre-read memory 217 and an off-chip RX buffer descriptor pre-read memory 221 may be utilized, together with the RX data engine 219 and the TX data engine 215 on the NIC 203, in order to manage the transmit flow 223 and the receive flow 225.

During L4 processing, a driver running on a main system processor coverts the output from the L5 processing into TX buffer descriptor queue 211 entries. The main difference between L4 and L5 processing is that in order to perform the L4 offload, the NIC must keep track of data for each connection individually, so the number of queues and amount of queued information can be significant. The data pointed to by the queue entries is the portions of virtual memory space specified by the L5 processing level. For L4 offload level, the TX buffer descriptor queue 211 for each connection must be read and subsequent processing may be performed for levels 4, 3, 2, and 1.

FIG. 3 is a block diagram illustrating conventional L5 processing. The NIC 303 is connected to a host memory 301 via an interface bus 305. Referring to FIG. 3, the NIC 303 may comprise a RX data engine 325 and a TX data engine 323. The NIC 303 may be connected to an off-chip translation page table (TPT) memory 311. The off-chip TPT memory 311 may comprise a plurality of upper translation page tables 313 and a plurality of lower translation page tables 315. The host memory 301 may comprise application virtual memory buffers, contained in equal size host memory pages or blocks 307. Network data may be communicated with the NIC via the transmit flow 327 and the receive flow 329. Data between the NIC 303 and the host memory 301 may be exchanged via the communication bus 305.

L5 offload buffer management processing is more structured than L2 and L4 processing. Normally, the buffers 307 on the host memory 301, for any L5 transmit or receive operations, are described by a two level page table system—lower level and upper level. The upper level is normally called the upper level translation page table (Upper TPT) and identifies a specific buffer for a single or multiple operations. The upper TPT entry identifies a starting virtual address and length for the application buffer, just as the application sees the buffer, as well as the location in the lower TPT entries, where the physical page locations may be located. The upper TPT entry may also include certain access permissions for the buffer.

The lower level is normally referred to as the lower level translation page table (lower TPT). The lower TPT entry is a simple page, or block table, where each entry points to a standard sized system memory page or block. Each of the lower TPT entries 315 may have multiple upper TPT entries 313 pointing to it, where each upper TPT entry may describe a different non-overlapping or overlapping application buffers. This type of L5 buffer description corresponds directly with modern virtual memory general purpose processing systems, such as the systems in FIGS. 1C and 1D, which organize data memory as a large pool of fixed size buffers or storage servers.

In conventional L5 offload systems, the page table system is uploaded and ready in the NIC before it is needed for L5 processing. Each page table is used for the duration of time it is needed and then unloaded from the NIC when it will no longer be used. The L5 processing method may produce very high performance for high-cost NIC implementations. However, it requires a very large amount of memory for all the page tables needed to be loaded for data processing. L5 processing, therefore, may be very expensive as it often requires multiple devices for implementation. For example, an off-chip TPT memory 311, with upper TPT entries 313 and lower TPT entries 315 may be needed, together with a TX data engine 323 and an RX data engine 325 on the NIC 303, in order to manage the transmit flow 327 and the receive flow 329.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain aspects of the invention may be found in a method and system for efficient buffer management for layer 2 (L2) through layer 5 (L5) network interface controller applications. Certain aspects of the invention may comprise determining whether an active NIC connection is an L2 type, an L4 type, or an L5 type. At least one buffer descriptor may be cached locally on a network interface controller (NIC) managed by a NIC application. The buffer descriptor is associated with the determined type of the active NIC connection. If the at least one active NIC connection is of the L2 or L4 type, the buffer descriptor may comprise at least one of a receive (RX) buffer descriptor and a transmit (TX) buffer descriptor. If the NIC connection is of the L5 type, the buffer descriptor may comprise at least one of a upper translation page table (TPT) entry and a lower TPT entry.

If the NIC connection is of the L2 or L4 type, at least one memory page in a host memory may be associated with the RX buffer descriptor and/or the TX buffer descriptor. If the at least one active NIC connection is of the L5 type, a memory page in a host memory may be associated with the lower TPT entry. If the at least one active NIC connection is of the L2 or L4 type, the RX and TX buffer descriptors may be stored in RX and TX buffer descriptor queues in the host memory. If the at least one active NIC connection is of the L5 type, the lower TPT entry may be stored in a lower translation pager table in the host memory. The buffer descriptor may be cached in a shared cache entry on the NIC, where the shared cache entry may be adapted to store a L2, L4 and/or L5 type buffer descriptor.

Each of the upper translation page table entry may refer to at least one lower translation page table entry, where each of the at least one lower translation page table entry may comprise at least a memory page identifier of a particular host memory page. In addition, each of the upper translation page table entry may comprise information such as a buffer length and/or a starting virtual address. An L5 virtual memory page table, an upper translation page table and/or a lower translation page table, may remain in the host memory and may be fetched, and possibly re-fetched, as needed until the L5 virtual memory page is no longer required. The L2, L4, and L5 buffer information may be stored on the NIC for only currently active connections.

Caching of the TX buffer descriptor may further comprise determining whether a cache entry is free and whether at least one control bit identifying whether the cache entry is asserted. The control bit may be, for example, a free bit. Caching of the TX buffer descriptor and the RX buffer descriptor may also comprise determining an identifier of the at least one active NIC connection. The determined identifier may be, for example, a connection ID value.

With regard to caching of the TX buffer descriptor, if the active NIC connection is a L2 type connection, a queue location in the host memory which is associated with a TX buffer descriptor queue may be determined. If active NIC connection is a L4 type connection, a queue location in the host memory which is associated with a TX buffer descriptor queue may be determined. Finally, if the active NIC connection is a L5 type connection, the location of the upper TPT entry as well as the location and offset into a lower translation page table entry may be determined.

With regard to caching of the RX buffer descriptor, if the active NIC connection is an L2 type connection, a queue location in the host memory which is associated with the RX buffer descriptor queue may be determined. If the active NIC connection is a L4 type connection, a queue location in the host memory which is associated with an RX buffer descriptor queue may be determined. If the active NIC connection is a L5 type connection, the location of the upper TPT entry as well as the location and offset into a lower translation page table entry may be determined. The method for efficient buffer management may utilize any cache management scheme appropriate to the task, including least recently used (LRU) logic scheme, a content addressable memory (CAM) address translation scheme and/or a directed replacement scheme, MRU replacement scheme, different associatively structures, etc.

Certain aspects of the system for efficient buffer management for layer 2 through layer 5 network interface controller applications may comprise at least one processor that determines whether at least one active NIC connection is one of an L2 type, an L4 type, or an L5 type. At least one buffer descriptor may be cached by the processor locally on a network interface controller (NIC) managed by the NIC applications and the buffer descriptor is associated with the determined type of the at least one active NIC connection. The cached buffer descriptor may comprise a receive (RX) buffer descriptor, a transmit (TX) buffer descriptor, a upper translation page table (TPT) entry, and a lower TPT entry.

The processor may associate a memory page in a host memory with the RX buffer descriptor, the TX buffer descriptor, and/or with the lower TPT table entry. The processor may store the RX buffer descriptor and/or the TX buffer descriptor in a RX and/or a TX buffer descriptor queue in the host memory, if the active NIC connection is of the L2 or L4 type. The processor may store the lower TPT entry in a lower translation page table in the host memory, if the active NIC connection is of the L5 type. The processor may cache the buffer descriptor in a shared cache entry on the NIC, where the shared cache entry may be adapted to store a L2, L4 and/or a L5 type buffer descriptor. Each of the upper translation page table entry may refer to at least one lower translation page table entry, where each of the at least one lower translation page table entry may comprise at least a memory page identifier of a particular host memory page. In addition, each of the upper translation page table entry may comprise information such as a buffer length and/or a starting virtual address.

Caching of the TX buffer descriptor by the processor may further comprise determining whether a cache entry is free and whether at least one control bit identifying whether the cache entry is free is asserted. The control bit may be, for example, a free bit. Caching of the TX buffer descriptor by the processor and the RX buffer descriptor may also comprise determining an identifier of the at least one active NIC connection. The determined identifier may be, for example, a connection ID value.

With regard to caching of the TX buffer descriptor, if the active NIC connection is a L2 type connection, a queue location in the host memory which is associated with a TX buffer descriptor queue may be determined by the processor. If active NIC connection is a L4 type connection, a queue location in the host memory which is associated with a TX buffer descriptor queue may be determined by the processor. Finally, if the active NIC connection is a L5 type connection, location of the upper TPT entry and the location and offset into a lower translation page table entry may be determined by the processor and the offset may be associated with the TX buffer descriptor information.

With regard to caching of the RX buffer descriptor, if the active NIC connection is an L2 type connection, a queue location in the host memory which is associated with the RX buffer descriptor queue may be determined. If the active NIC connection is a L4 type connection, a queue location in the host memory which is associated with an RX buffer descriptor queue may be determined. If the active NIC connection is a L5 type connection, an offset into a lower translation page table entry may be determined and the offset may be associated with the RX buffer descriptor information. The system for efficient buffer management may utilize a least recently used (LRU) logic scheme, a content addressable memory (CAM) address translation scheme and/or a direct replacement scheme during management of the buffer identifying information cached within the NIC.

These and other advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for efficient buffer management for layer 2 through layer 5 network interface controller applications. Certain aspects of the invention may comprise determining whether an active NIC connection is one of an L2 type, an L4 type, or an L5 type. At least one buffer descriptor may be cached locally on a network interface controller (NIC) managed by the NIC applications. The buffer descriptor may be associated with the determined type of active NIC connection. The cached buffer descriptor may comprise a receive (RX) buffer descriptor and a transmit (TX) buffer descriptor. At least one receive memory buffer located in a host memory may be associated with the receive buffer descriptor and at least one transmit memory buffer located in a host memory may be associated with the transmit buffer descriptor. Data associated with the L2 type, L4 type and L5 type NIC connection may be handled in a single memory located on the host.

The invention utilizes a highly customized buffer system that may fetch and store buffer information for L2, L4, and L5 connections for processing on the NIC on an as-needed basis. The customized buffer system may comprise a single common cache structure adapted to handle buffer information associated with multiple types of connections at the same time. For example, L2, L4 and L5 connections may be processed utilizing the single common cache structure within the NIC. In this manner, integration of multiple types of traffic, such as L2, L4 and/or L5, may be integrated into a single silicon suitable for mass production commodity markets. In accordance with an embodiment of the invention, a main copy for at least a portion of the buffer information may remain on a host system and may be cached as needed by a single common cache structure on the NIC.

Figure 1A:
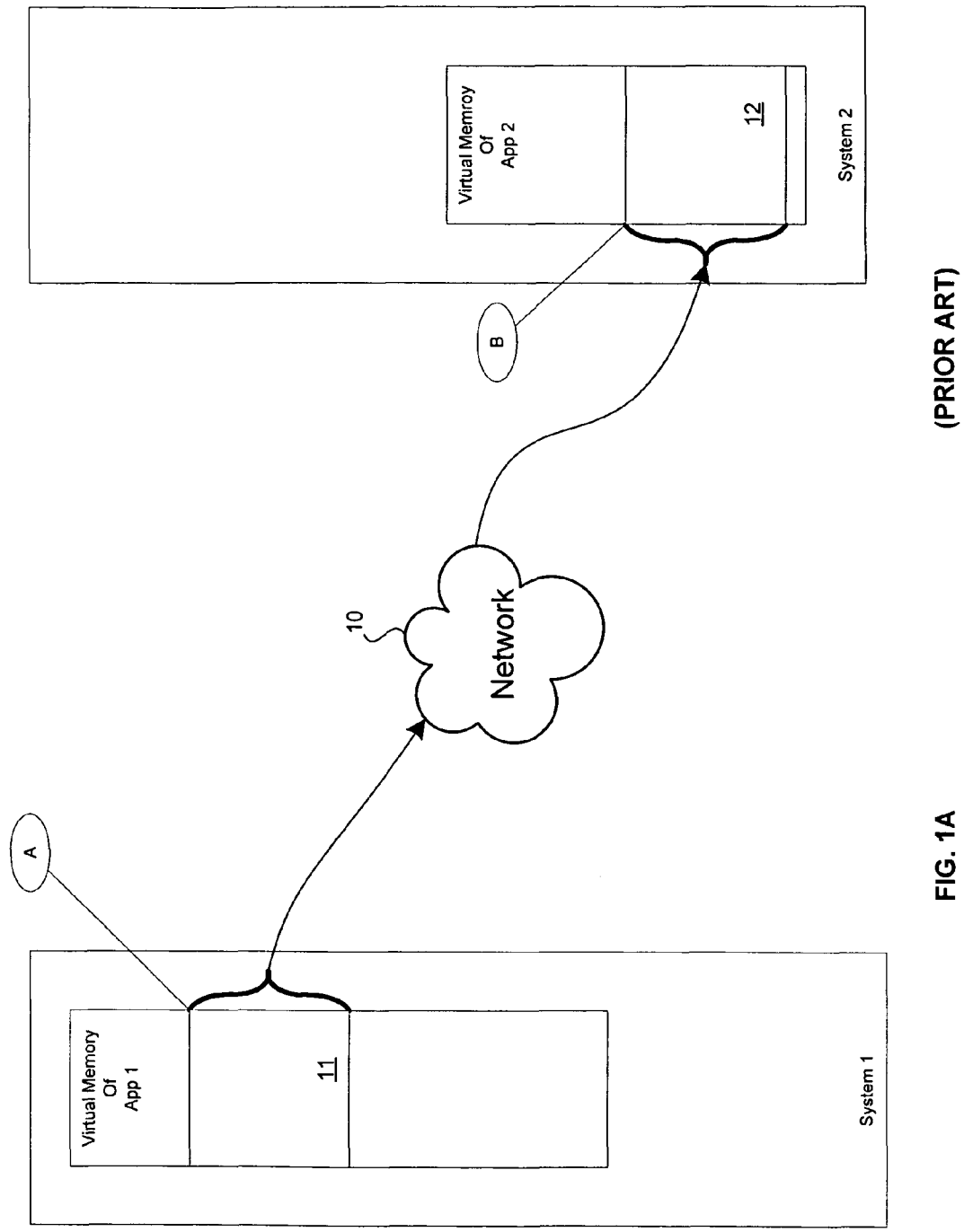
FIG. 1A is a block diagram illustrating a conventional L5 command sequence.
Figure 1B:
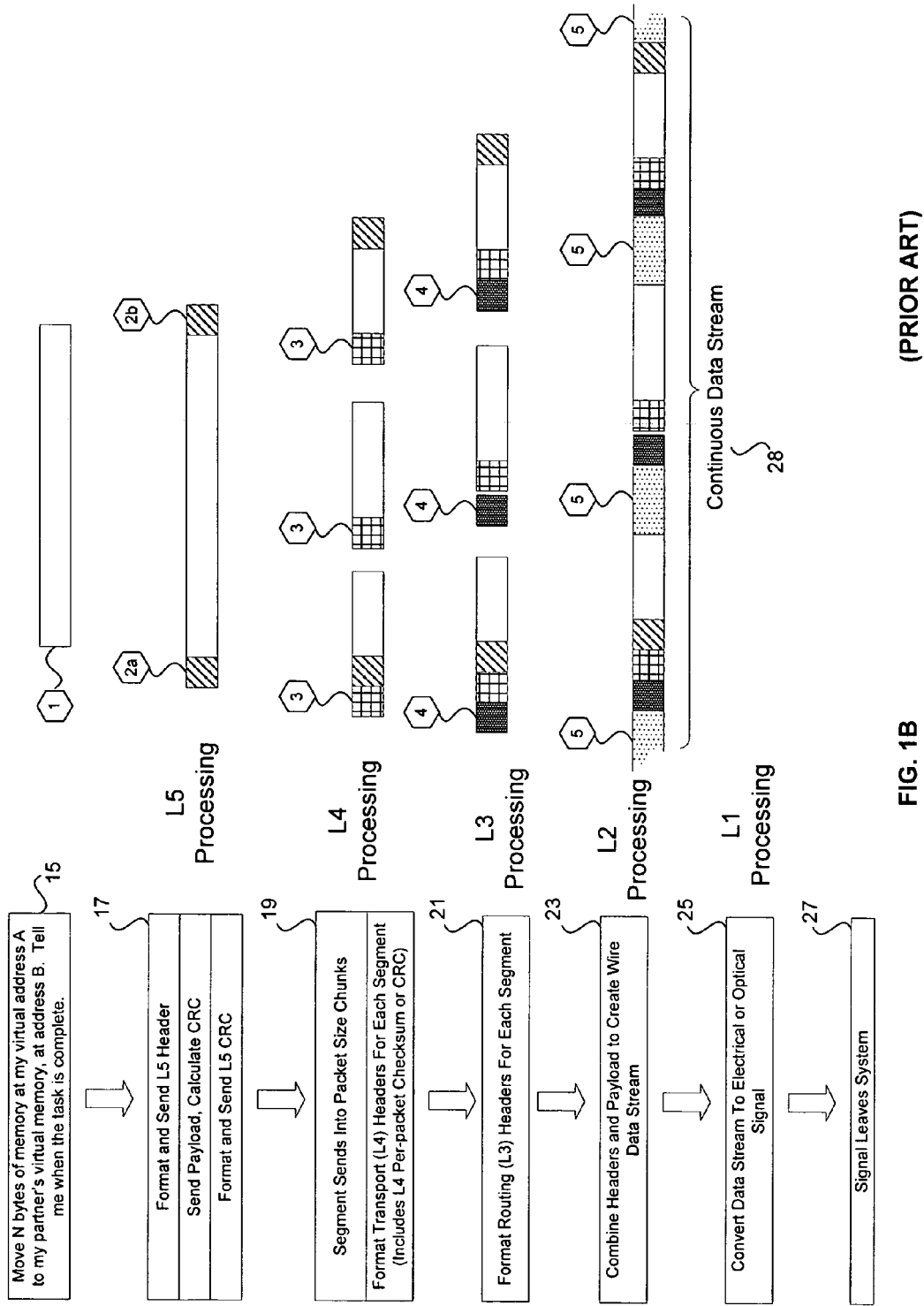
FIG. 1B is a block diagram illustrating L1 through L5 processing of the conventional L5 command of FIG. 1A.
Figure 1C:
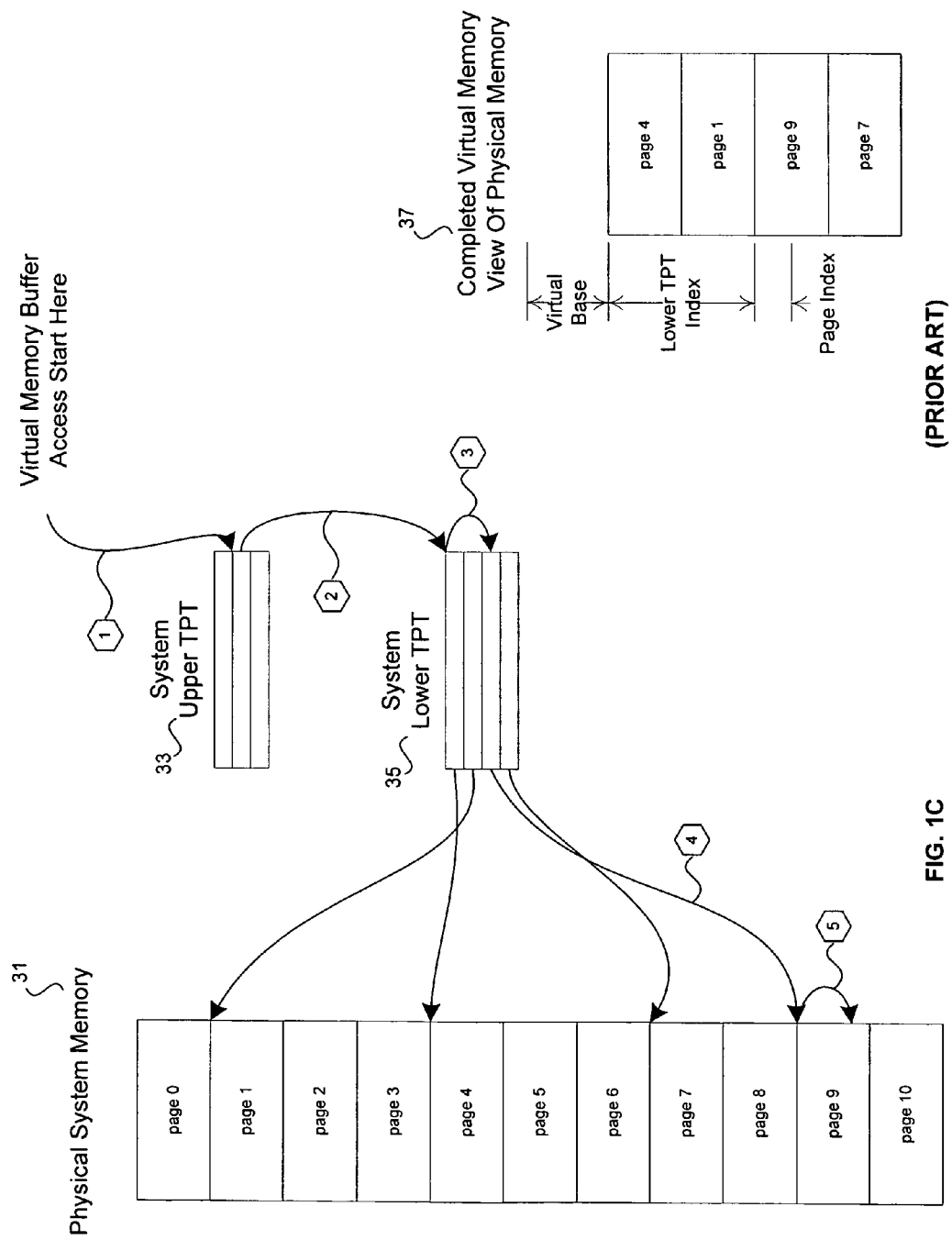
FIG. 1C is a block diagram of conventional virtual memory system for mapping physical memory.
Figure 1D:
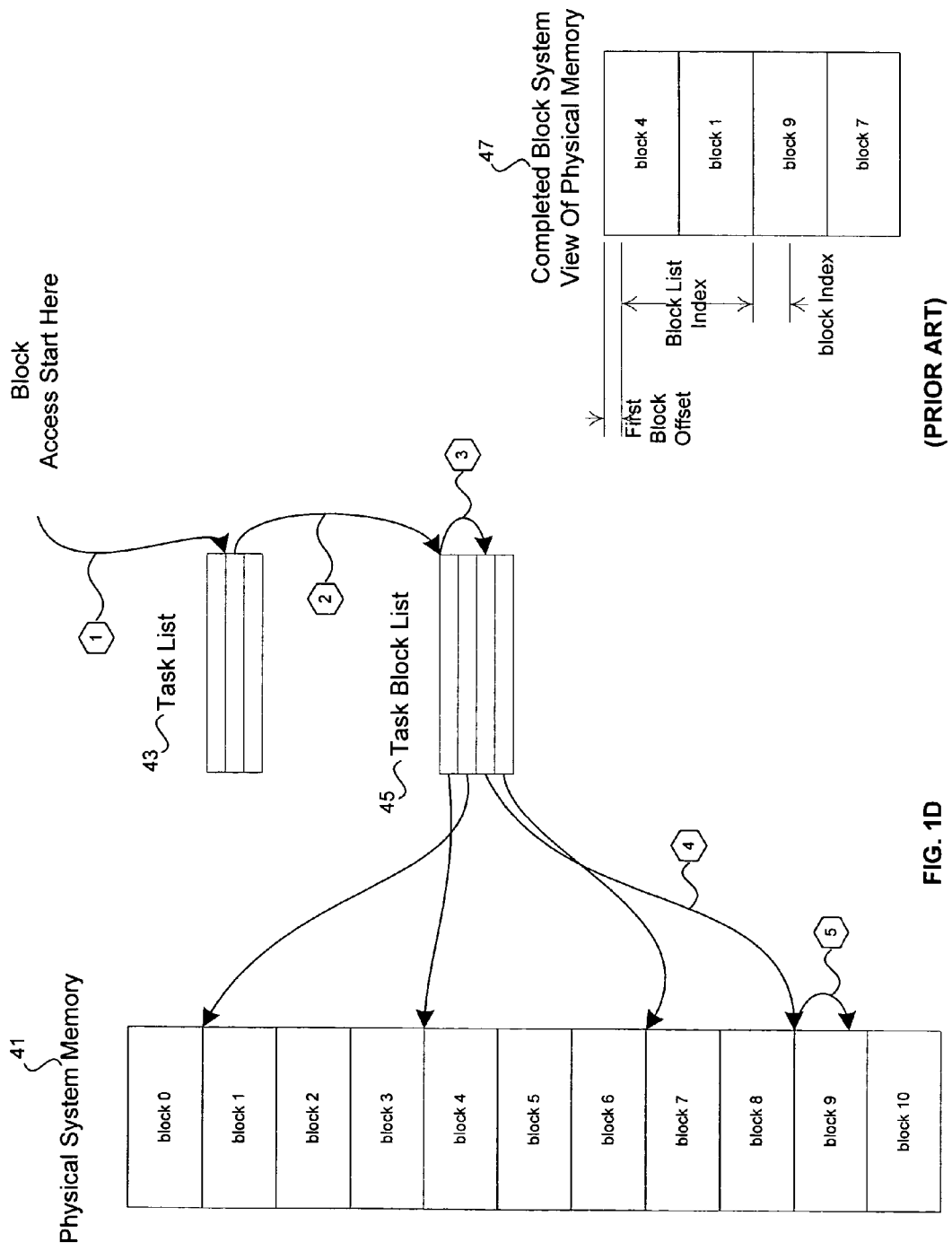
FIG. 1D is a block diagram of conventional block organization system for mapping physical memory.
Figure 1E:
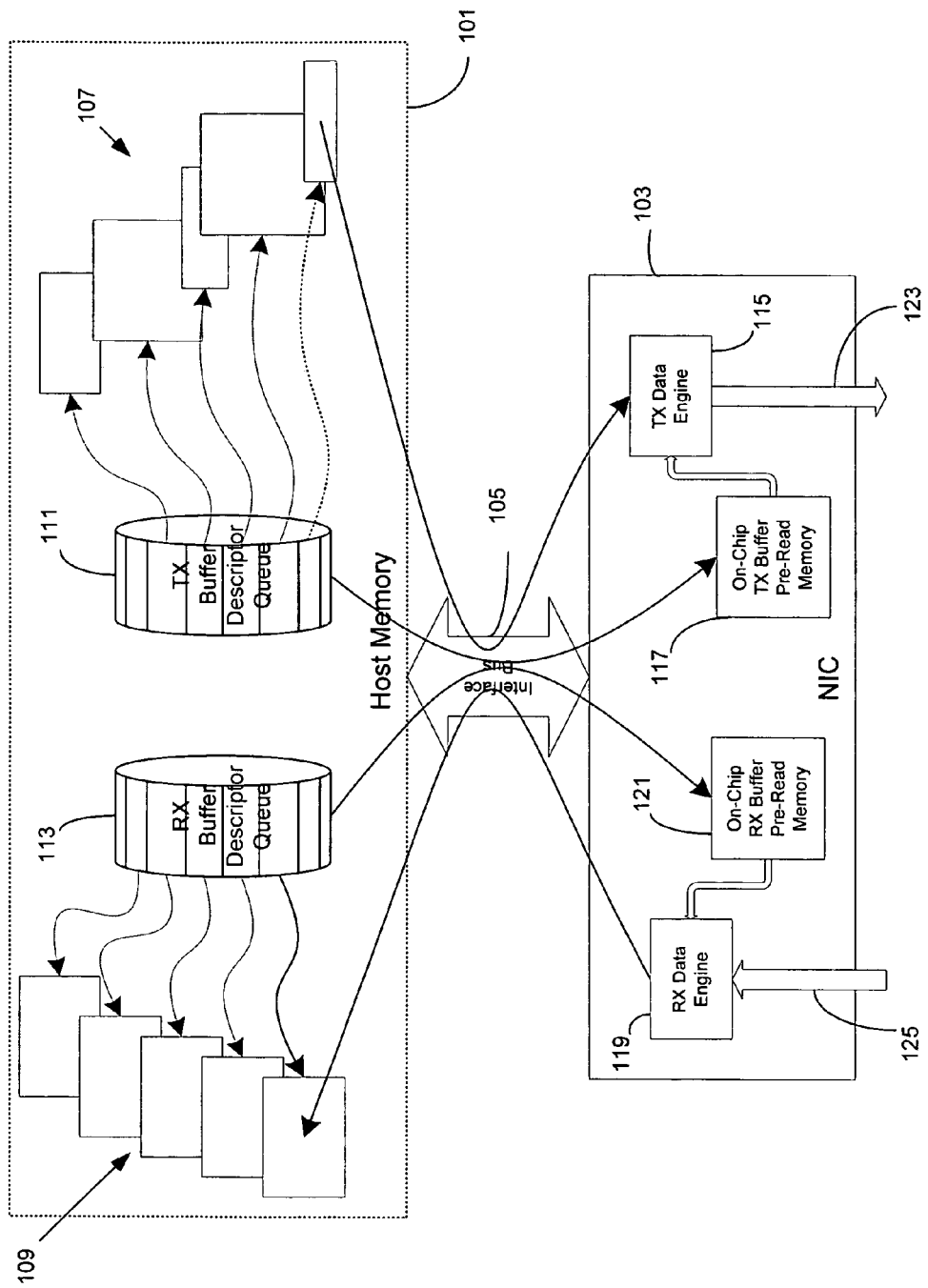
FIG. 1E is a block diagram illustrating conventional L2 processing.
Figure 2:
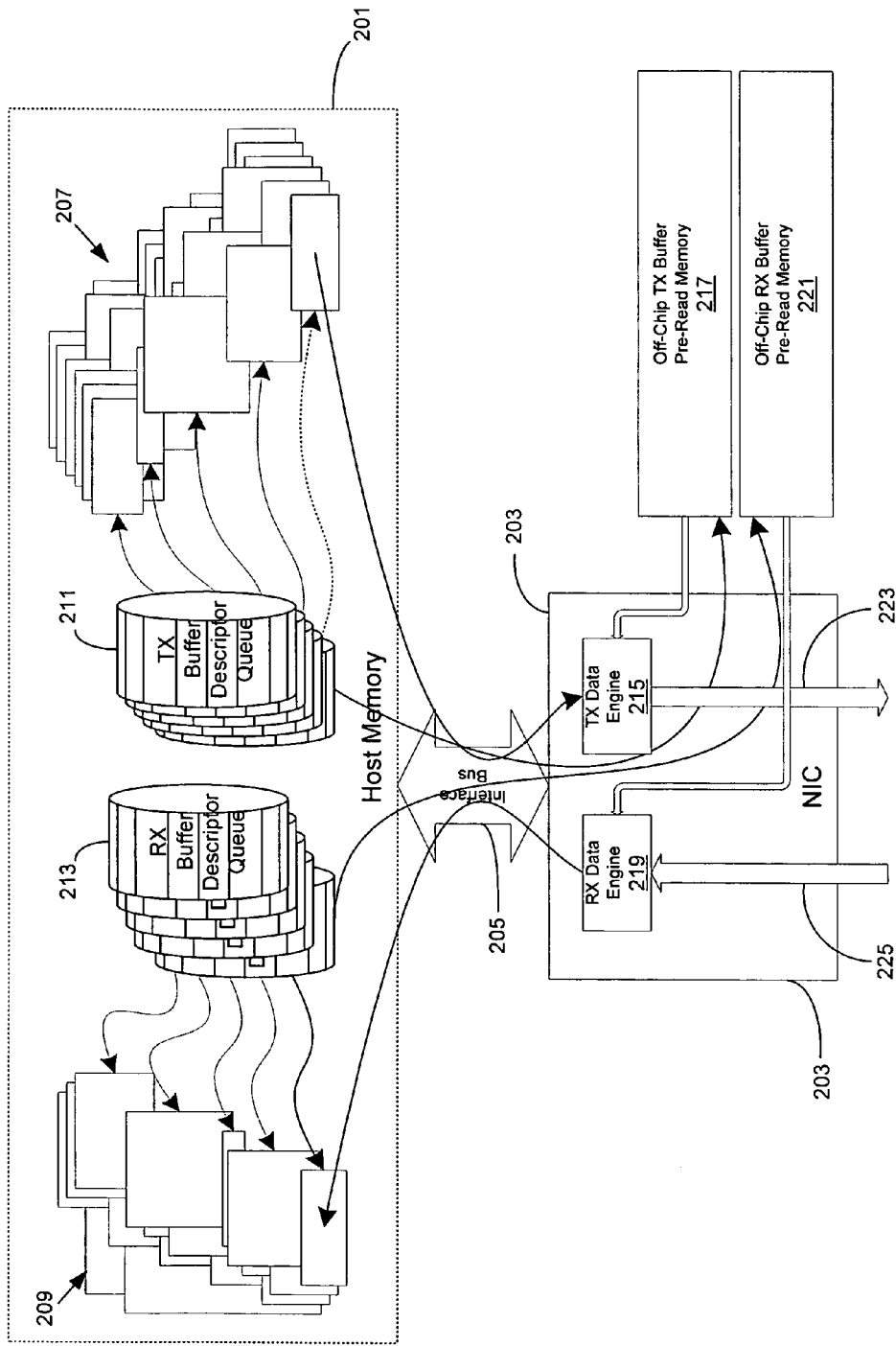
FIG. 2 is a block diagram illustrating conventional L4 processing.
Figure 3:
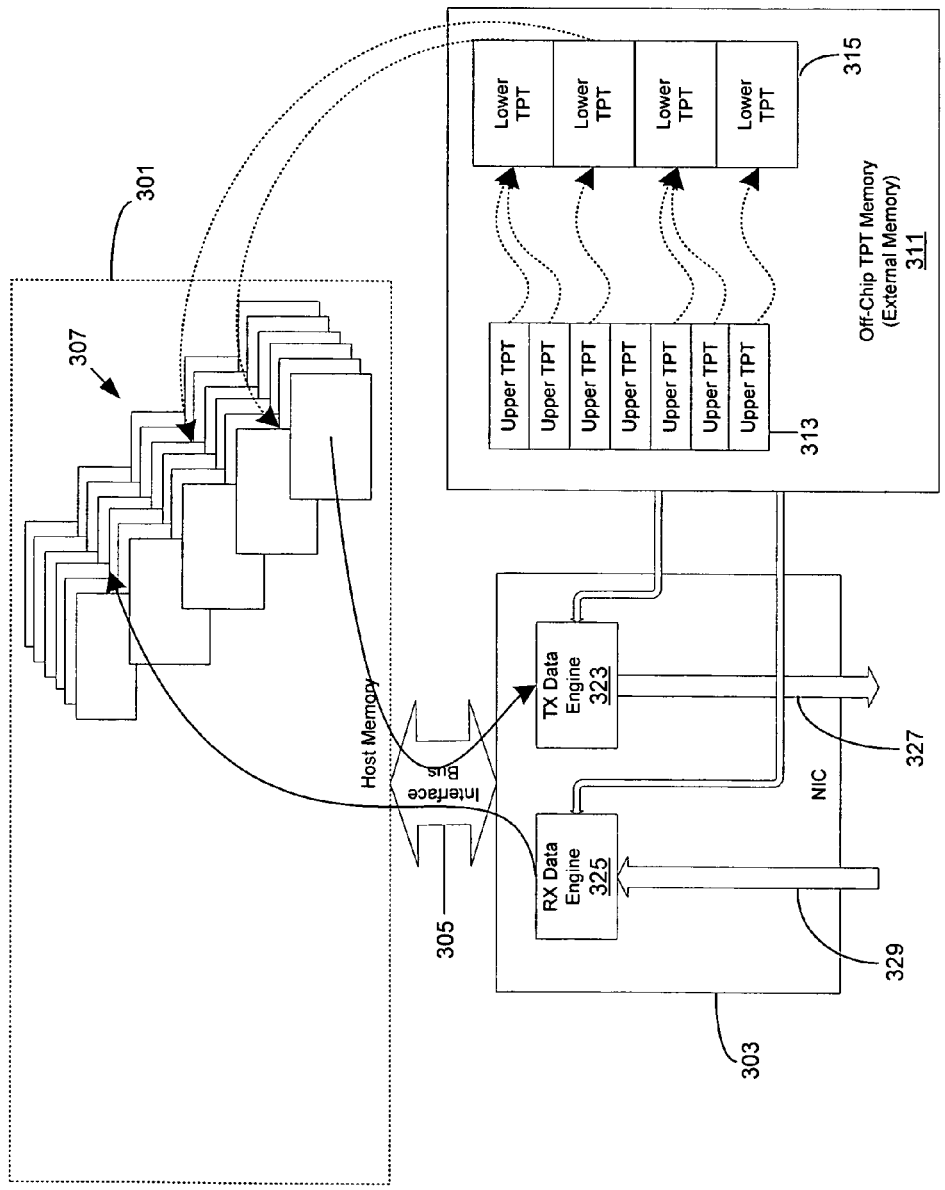
FIG. 3 is a block diagram illustrating conventional L5 processing.
Figure 4A:
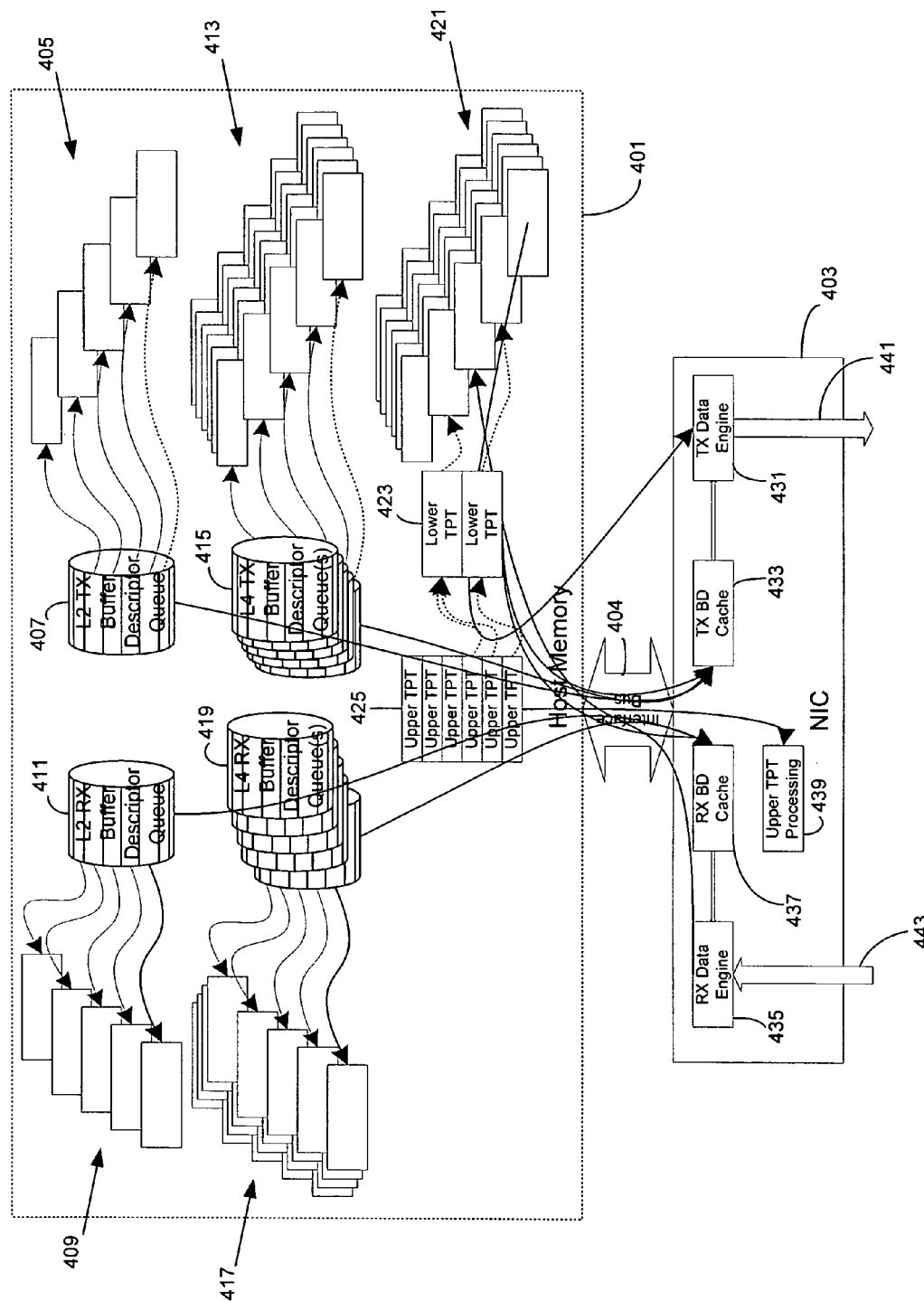
FIG. 4A is a block diagram illustrating single receive and transmit buffer descriptor cache structures for efficient buffer management for layer 2 (L2) through layer 5 (L5) network interface controller (NIC) applications, in accordance with an embodiment of the invention.

FIG. 4A is a block diagram illustrating single receive and transmit buffer descriptor cache structures for efficient buffer management for layer 2 (L2) through layer 5 (L5) network interface controller (NIC) applications, in accordance with an embodiment of the invention. Referring to FIG. 4A, there is shown a host memory 401 coupled to a NIC 403 via an interface bus 404. On the host memory 401, there is shown an L2 TX buffer descriptor queue 407; an L4 TX buffer descriptor queue 415, lower translation page tables 423; an L2 RX buffer descriptor queue 411; an L4 RX buffer descriptor queue 419; upper translation page tables 425; L2 TX buffers 405; L2 RX buffers 409; L4 TX buffers 413; L4 RX buffers 417; and L5 buffers 421. On the NIC 403 there is shown a data receive flow 443 coupled to an RX data engine 435; an RX buffer descriptor cache 437; a TX buffer descriptor cache 433; and a TX data engine 431 coupled to a data transmit flow 441.

In accordance with an embodiment of the invention, the L2 buffer descriptors, which may comprise the L2 TX buffer descriptor queue 407 and the L2 RX buffer descriptor queue 411, remain in the host memory 401 and may be fetched, and possibly re-fetched until the corresponding L2 TX buffers 405 and the L2 RX buffers 409 are consumed. The L4 buffer descriptors, which may comprise the L4 TX buffer descriptor queue 415 and the L4 RX buffer descriptor queue 419, remain in the host memory 401 and may be fetched and possibly re-fetched until the corresponding L4 TX buffers 413 and the L4 RX buffers 419 are consumed. The L5 virtual memory region description structure, which may comprise upper TPT entries 425 and lower TPT entries 423, remains in host memory and may be fetched and possibly re-fetched as needed until the corresponding L5 buffers 421 are consumed. The L2, L4, and L5 buffer information may be stored on the NIC 403 for only currently active connections. The L2, L4, and L5 lower TPT entry information may be stored in a shared cache entry on the NIC 403, such that the same shared cache entry may hold any of the three types of entries depending on the type of current active connections, thus making efficient use of the NIC memory based on the traffic conditions.

Figure 4B:
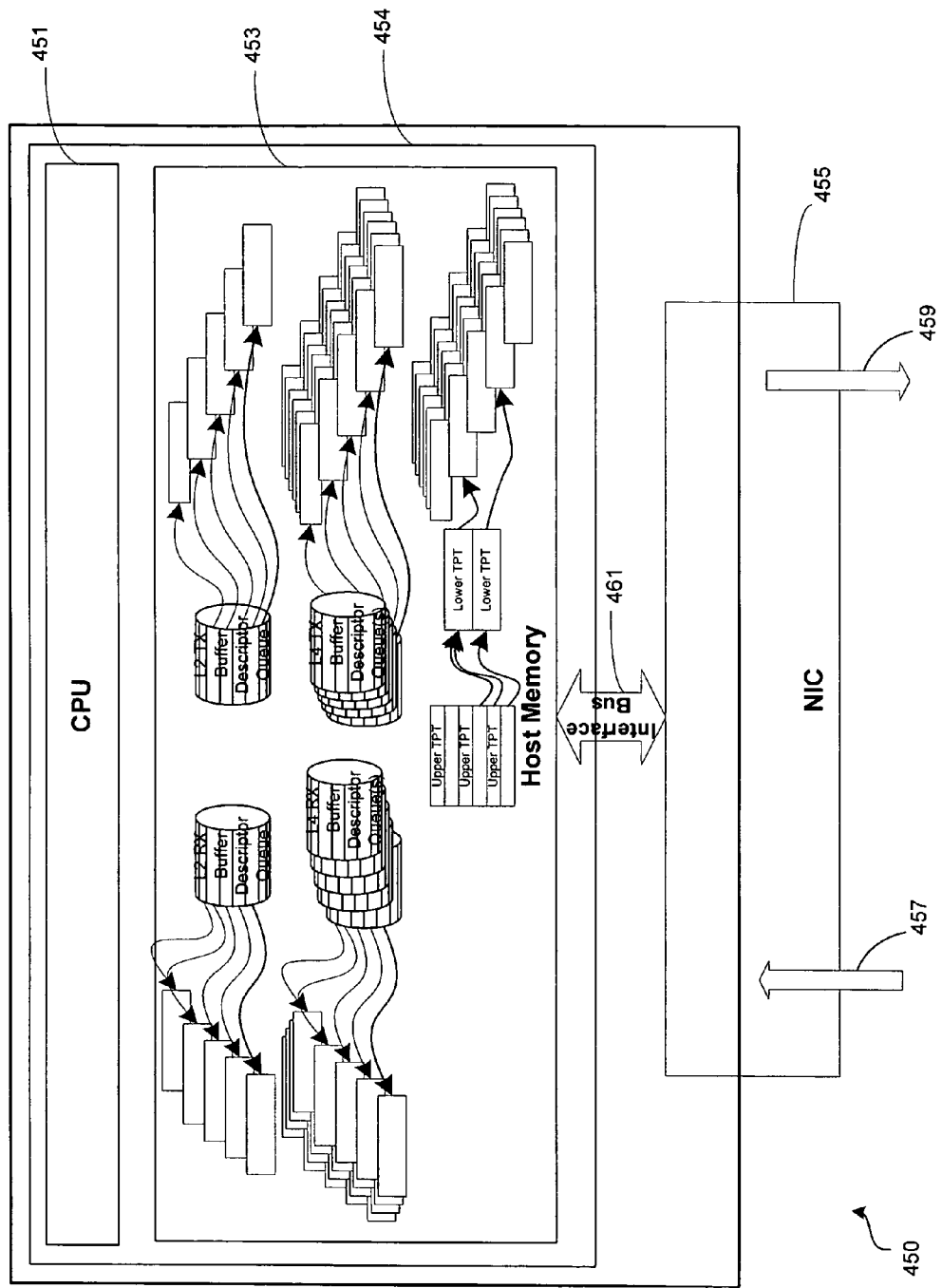
FIG. 4B is a block diagram of an exemplary system that may be used in connection with efficient buffer management for layer 2 (L2) through layer 5 (L5) network interface controller (NIC) applications, in accordance with an embodiment of the invention.

FIG. 4B is a block diagram of an exemplary system 450 that may be used in connection with efficient buffer management for layer 2 (L2) through layer 5 (L5) network interface controller (NIC) applications, in accordance with an embodiment of the invention. Referring to FIG. 4B, the system 450 may comprise a host 454 and a network interface controller (NIC) 455. The host 454 may comprise a processor (CPU) 451 and a host memory 453. The host memory 453 may be the same host memory 401 as illustrated on FIG. 4A so that the host memory 453 is adapted to handle efficient buffer management for L2 through L5 NIC applications. The host memory 453 is communicatively coupled to the NIC 455 via an interface bus 461. Data may be communicated to and from the device 450 via the receive data flow 457 and the transmit data flow 459. In a different embodiment of the present invention, the NIC 455 may be a part of the host 454.

Figure 5A:
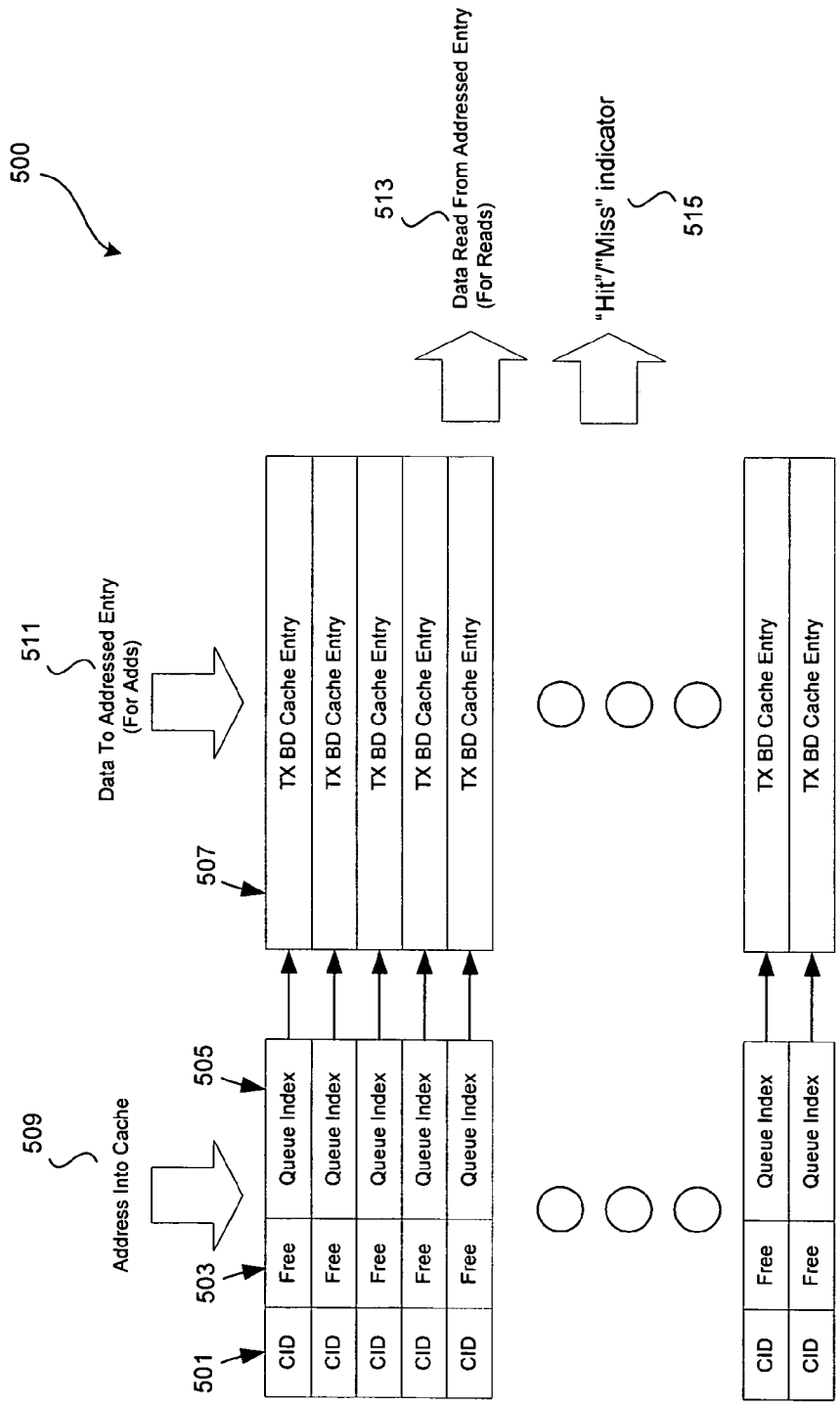
FIG. 5A is a block diagram illustrating an exemplary transmit buffer descriptor cache that may be utilized for efficient buffer management for layer 2 (L2) through layer 5 (L5) network interface controller (NIC) applications, in accordance with an embodiment of the invention.

FIG. 5A is a block diagram illustrating an exemplary transmit buffer descriptor cache structure 500 that may be utilized for efficient buffer management for layer 2 (L2) through layer 5 (L5) network interface controller (NIC) applications, in accordance with an embodiment of the invention. The TX buffer descriptor cache structure 500 may be a fully associative cache structure, for example. Notwithstanding, the TX buffer descriptor cache may also be implemented as partially associative cache structure. FIG. 5A illustrates a fully associative cache structure, which depicts various aspects of the invention.

In accordance with an aspect of the invention, the address used to lookup a TX buffer descriptor cache entry 507 may comprise the following exemplary parameters or values: a connection ID (CID) value 501, a free bit value 503, and a queue index value 505. Data stored in a buffer descriptor cache entry 507 may vary depending on the type of connection, Such data may include the host address of a data buffer and other characteristics about the data buffer, for example.

For the L2 traffic, the CID value 501 may be a fixed constant value, or set of values, that is not used for any other types of traffic. For L4 traffic, a specific range, or set of values, may be used for the CID value 501, each identifying the connection with which the TX buffer descriptor cache entry 507 is associated. For L5 traffic, the CID 501 may identify, at a minimum, the upper TPT table to which the TX buffer descriptor entry 507 belongs. For L5 traffic, the CID value 501 may also have other data encoded into it. The full CID value 501 may be encoded such that the L2, L4, and L5 value sets may not overlap. The free bit value 503 may indicates whether the cache line, or the TX buffer descriptor cache entry 507, is free or valid/used.

For L2 and L4 connections, the queue index value 505 may be associated with the queue index of the queue location where the TX buffer descriptor cache entry 507 came from in the host memory. For L5 connections, the queue index value 505 may comprise the offset into the lower TPT table where the TX buffer descriptor cache entry was filled from.

For L2 and L4 connections, the TX buffer descriptor cache entry 507 may comprise a corresponding entry from the L2 and L4 TX buffers in the host memory. This may include the host physical address and length of the TX buffer described by the TX buffer descriptor, as well as other characteristics with regard to the TX buffer. For L5 connections, the TX buffer descriptor cache entry 507 may be filled from a location in a lower translation page table in the host memory. The TX buffer descriptor cache entry 507 may includes the host physical page address of one page of a host virtual memory buffer, for example.

A plurality of operations may be utilized to control operation of the TX buffer descriptor cache structure 500 and may include, for example, an add operation, a read operation, an invalidate operation and a reset operation. The inputs into the TX buffer descriptor cache structure 500 may comprise a cache address data 509 and a memory buffer data 511. The memory buffer data 511 may be recorded into a TX buffer descriptor cache entry 507 and become a part of the TX buffer descriptor cache structure 500. Cache address data 509 entering the TX buffer descriptor cache structure 500 may comprise a CID value, a free bit value and a queue index value. The outputs from the TX buffer descriptor cache structure 500 may comprise data output 513 read from the TX buffer descriptor cache entry 507 and a "hit" indicator value 515.

In accordance with an aspect of the invention, adds may be accomplished by doing a cycle where the address is set such that any line with the free bit 503 as '1' will be found, starting from the first cache line. A value of one (1) for the free bit may be associated with a TX buffer descriptor cache entry value being available for an add operation. A hit occurs if the free bit value indicates the cache entry is free for valid (for example, if free bit is equal to one (1)). If a hit occurs, the memory buffer data 511 may be loaded into the TX buffer descriptor cache entry 507. In addition, the CID value 501 and the queue index value 505 may also be recorded. Since the cache entry field is now unavailable, the free bit value may be reset by changing it to zero (0), indicating an unavailable TX buffer descriptor cache entry field 507. The TX buffer descriptor cache structure 500 may also report the "hit" via the "hit" indicator output value 515. If a cache entry with free bit equal to one (1) is not found, then the add operation will wait until there is a "hit". While in this waiting state, the read and invalidate operations are allowed to continue.

In accordance with an aspect of the invention, a read operation on the TX buffer descriptor cache structure 500 may be accomplished by finding a cache entry with a matching CID value 501, a matching queue index value 505 and a free bit equal to zero (0). If such an entry is found, then it may be reported via the data output 513 and "Hit" indicated. If the entry is not found, then a "miss" may be indicated by the hit/miss indicator 515.

In accordance with an aspect of the invention, an invalidate operation on the TX buffer descriptor cache structure 500 may be accomplished by finding a cache entry with a matching CID value 501, a matching queue index value 505 and/or a free bit equal to zero (0). If such an entry is found, then it may be invalidated by resetting the free bit, free bit equal to one (1), which indicates an available TX buffer descriptor cache entry field 507. It should be recognized that the logic values utilized for the matching of the queue index value 505, the CID value 501 and/or the free bit equal to zero (0), the free bit may be changed without departing from the various aspects of the invention. When the free operation is complete, a "hit" is indicated to show success.

Figure 5B:
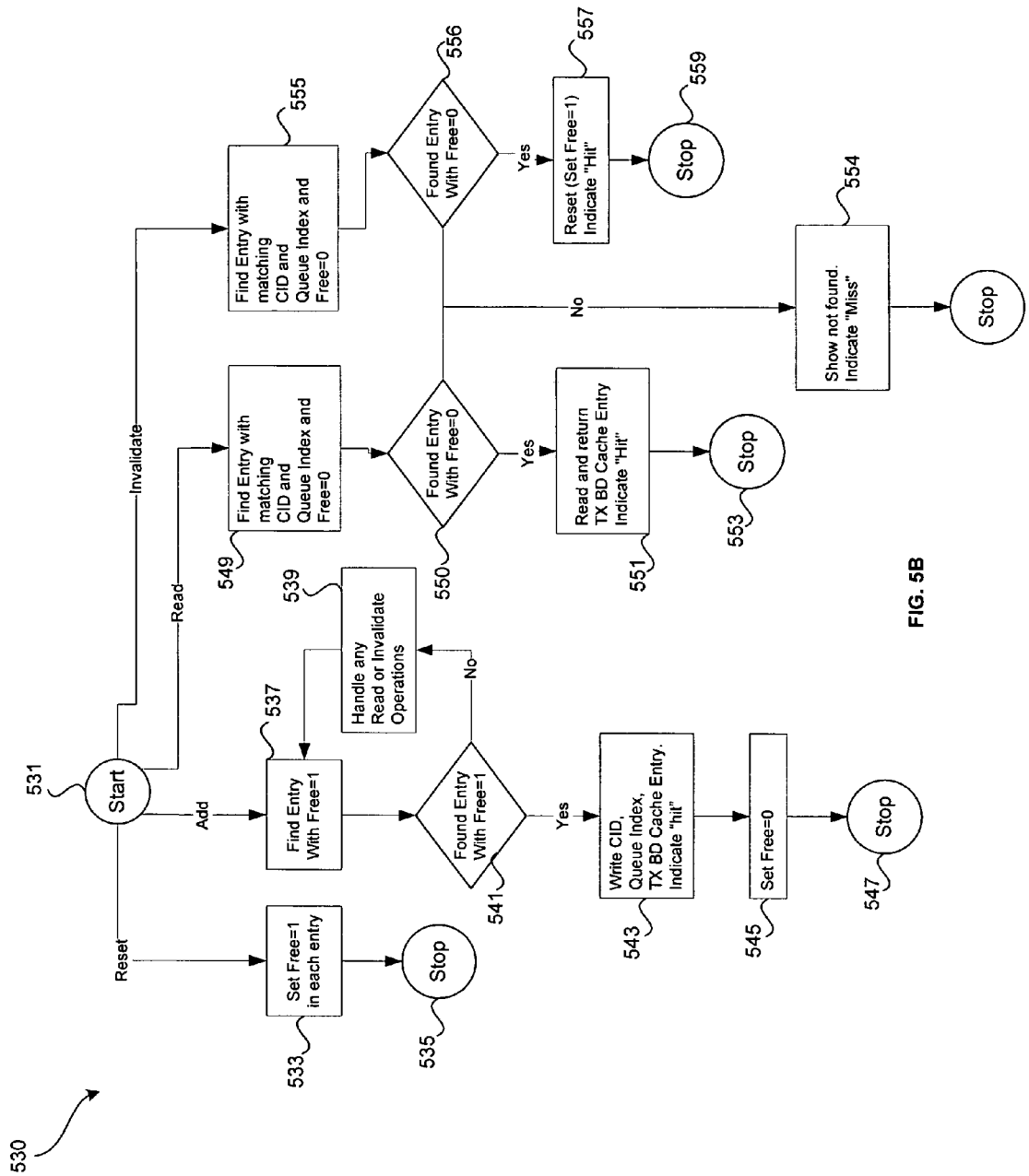
FIG. 5B is a flow diagram illustrating exemplary reset, add, read and invalidate operations for a transmit buffer descriptor cache entry that may be utilized for efficient buffer management for layer 2 (L2) through layer 5 (L5) network interface controller (NIC) applications, in accordance with an embodiment of the invention.

FIG. 5B is a flow diagram 530 illustrating exemplary reset, add, read and invalidate operations that may be utilized in conjunction with the TX buffer descriptor cache structure 500 of FIG. 5A, in accordance with an embodiment of the invention. Referring to FIG. 5B, the exemplary steps may start at step 531. With regard to an add operation, at step 537, a TX buffer descriptor cache structure may be searched for a cache entry with a free bit value of one (1), which indicates the entry is free for valid. At step 541 it is ascertained whether there was a "hit", i.e., whether a cache entry with free bit equal to one (1) was found. If such an entry was not found, then at step 539 any read and invalidate operations may be performed. The add operation may then loop back to step 537 and search again for a cache entry with the free bit equal to one (1). At step 541, if there was a "hit" and a cache entry with free bit equal to one (1) was found, then at step 543 the CID value, the queue index value and the TX buffer descriptor cache entry value may be loaded. A "hit" may also be indicated as an output via the output "hit" indicator value. At step 543, the address 509 and data 511 are written to the cache entry found in step 537. At step 545, the free bit may be set to equal zero (0), indicating that the cache entry is not free for valid. The exemplary steps end at step 547.

Referring again to FIG. 5B, the exemplary steps with regard to a read operation, may start at step 531. At step 549, a TX buffer descriptor cache structure may be searched for a cache entry with a matching CID value, queue index value, and a free bit equal to zero (0), indicating the cache entry is valid. At 550, it may be determined whether a free bit entry equal to zero (0) is located. If there is such a match, the specific matching TX buffer descriptor cache entry data value is read and returned as an output at step 551 and "hit" may be indicated. If a free bit entry equal to aero (0) is not located, a "miss" may be indicated at 554. The exemplary steps end at step 553.

The exemplary steps with regard to an invalidate operation, may start at step 531. At step 555, a TX buffer descriptor cache structure may be searched for a cache entry with a matching CID value, queue index value, and a free bit equal to zero (0), indicating the cache entry is valid. At 556, it may be determined whether a free bit entry equal to zero (0) is located. If there is such a match, at 557, the specific matching TX buffer descriptor cache entry is invalidated by resetting the free bit value by setting the free bit to equal one (1) and indicate "hit". If the entry is not found, then a "miss" may be indicated at 554. The exemplary steps end at step 559.

The exemplary steps with regard to a reset operation, may start at step 531. At step 533, a reset of all cache entries may be performed by setting the free bit value to one (1) in each entry. The exemplary steps end at step 535.

Figure 6A:
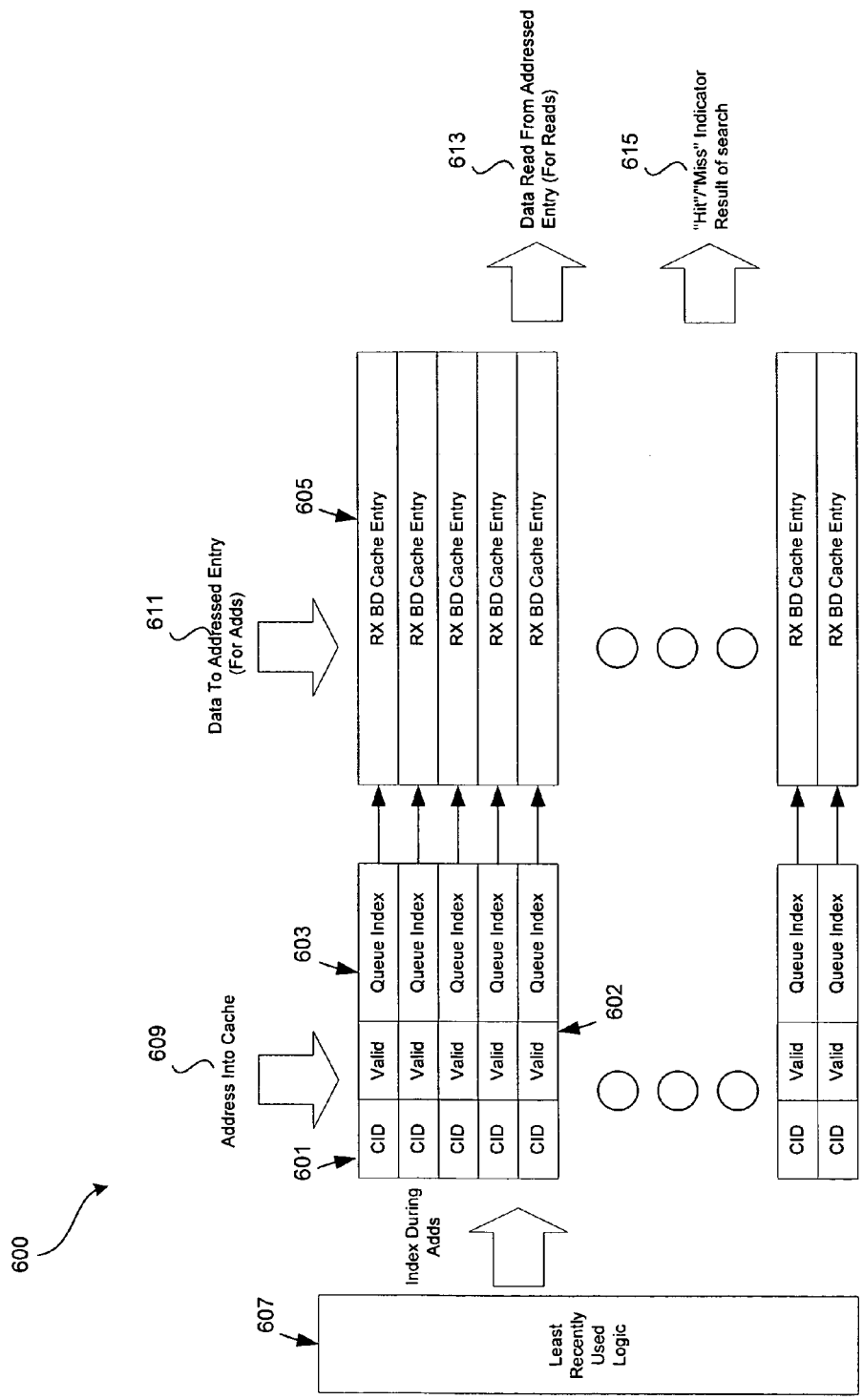
FIG. 6A is a block diagram illustrating an exemplary receive buffer descriptor cache that may be utilized for efficient buffer management for layer 2 (L2) through layer 5 (L5) network interface controller (NIC) applications, in accordance with an embodiment of the invention.

FIG. 6A is a block diagram illustrating an exemplary receive buffer descriptor cache structure 600 that may be utilized for efficient buffer management for layer 2 (L2) through layer 5 (L5) network interface controller (NIC) applications, in accordance with an embodiment of the invention. The RX buffer descriptor cache structure 600 may be similar to the TX buffer descriptor cache structure 500 of FIG. 5A except in this case, it may utilize a Least Recently Used (LRU) replacement algorithm 607, instead of the free bit value controlled by a directed replacement algorithm. In one aspect of the invention, LRU may be utilized on the TX buffer descriptor cache as well. Directed replacement scheme may be utilized on the RX BD cache. Other replacement algorithms may be used as well, such as most recently used (MRU), random replacement, first replacement, least recently added replacement, etc. Replacement schemes may be customized in many ways to adapt to specific traffic types and overall network processing architectures without diverging from the invention. Described here is a fully associative cache scheme, with a line size of one data entry. However, the invention is not so limiting and other line sizes may be optimized as well, without diverging from the invention.

In accordance with an aspect of the invention, the address used to lookup a RX buffer descriptor cache entry 605 may comprise the following exemplary parameters or values: a connection ID (CID) value 601, a valid bit value 602, a queue index value 603 and a RX buffer descriptor cache entry value 605.

For the L2 traffic, the CID value 601 may be a constant value that is not used for any other types of traffic. For L4 traffic, a specific range or set of values may be used for the CID value 601, each identifying the connection with which the RX buffer descriptor cache entry 605 is associated. For L5 traffic, the CID 601 identifies, at a minimum, the upper TPT table to which the RX buffer descriptor entry 605 belongs. For L5 traffic, the CID value 601 may also have other data encoded into it. The full CID value 601 may be encoded such that the L2, L4, and L5 value sets may not overlap.

The valid bit value 602 indicates whether the cache line (the RX buffer descriptor cache entry 605) is free or valid. For L2 and L4 connections, the queue index value 603 is associated with the queue index of the queue location where the RX buffer descriptor cache entry 605 came from in the host memory. For L5 connections, the queue index value 603 is the offset into the lower TPT table where the RX buffer descriptor cache entry was filled from.

For L2 and L4 connections, the RX buffer descriptor cache entry 605 is a corresponding entry from the L2 and L4 RX buffers in the host memory. For L5 connections, the RX buffer descriptor cache entry 605 may be filled from a location in a lower translation page table in the host memory. L5 data entry may also contains parts of the upper TPT entry.

A plurality of operations may be utilized to control operation of the RX buffer descriptor cache structure 600 and may include, for example, an add operation, a read operation, an invalidate operation and a reset operation. The inputs into the RX buffer descriptor cache structure 600 may comprise a cache address data 609 and a memory buffer data 611. The memory buffer data 611 may be recorded into a RX buffer descriptor cache entry 605 and become a part of the RX buffer descriptor cache structure 600. The cache address data 609 is being received in the same format as illustrated on FIG. 6A and may comprise a CID value, a valid value and a queue index value. The outputs from the RX buffer descriptor cache structure 500 may comprise data output 613 read from the RX buffer descriptor cache entry 605 and a "hit/miss" indicator value 615.

In accordance with an aspect of the invention, adds may be accomplished by doing a cycle where available cache entries are found. This may be achieved by locating a cache entry in which the valid value is set equal to zero (0). If an available cache entry is not found, then the LRU logic 607 is utilized in order to free the cache entry from the end of the LRU list (the least recently used entry). After a cache entry is found, or freed by the LRU logic 607, the memory buffer data 611 may be loaded into the RX buffer descriptor cache entry 605. In addition, the CID value 601 and the queue index value 603 may also be recorded. Since the cache entry field is now valid, the valid value may be set to one (1), indicating an valid RX buffer descriptor cache entry field 605. The entry may then be moved to the beginning of the LRU list of the least recently used entries, as it was most recently used.

A read operation on the RX buffer descriptor cache structure 600 may be accomplished by finding a cache entry with a matching CID value 601, a matching queue index value 603 and a valid bit equal to one (1), indicating an valid RX buffer descriptor cache entry field 605. If such an entry is found, then it may be read and reported via the data output 613. After the entry is reported, it may then be moved to the beginning of the LRU list of the least recently used entries, as it was most recently used.

An invalidate operation on the RX buffer descriptor cache structure 600 may be accomplished by finding a cache entry with a matching CID value 601, a matching queue index value 603 and a valid bit equal to one (1), indicating an valid RX buffer descriptor cache entry field 605. If such an entry is found, then it may be invalidated by resetting the valid bit to equal zero (0), which indicates an available RX buffer descriptor cache entry field 605.

A reset operation on the RX buffer descriptor cache structure 600 may be accomplished by setting the valid bit to equal zero (0) for all entries, which indicates an available RX buffer descriptor cache entry field 605. In addition, the LRU list with the least recently used entries may be initialized.

Figure 6B:
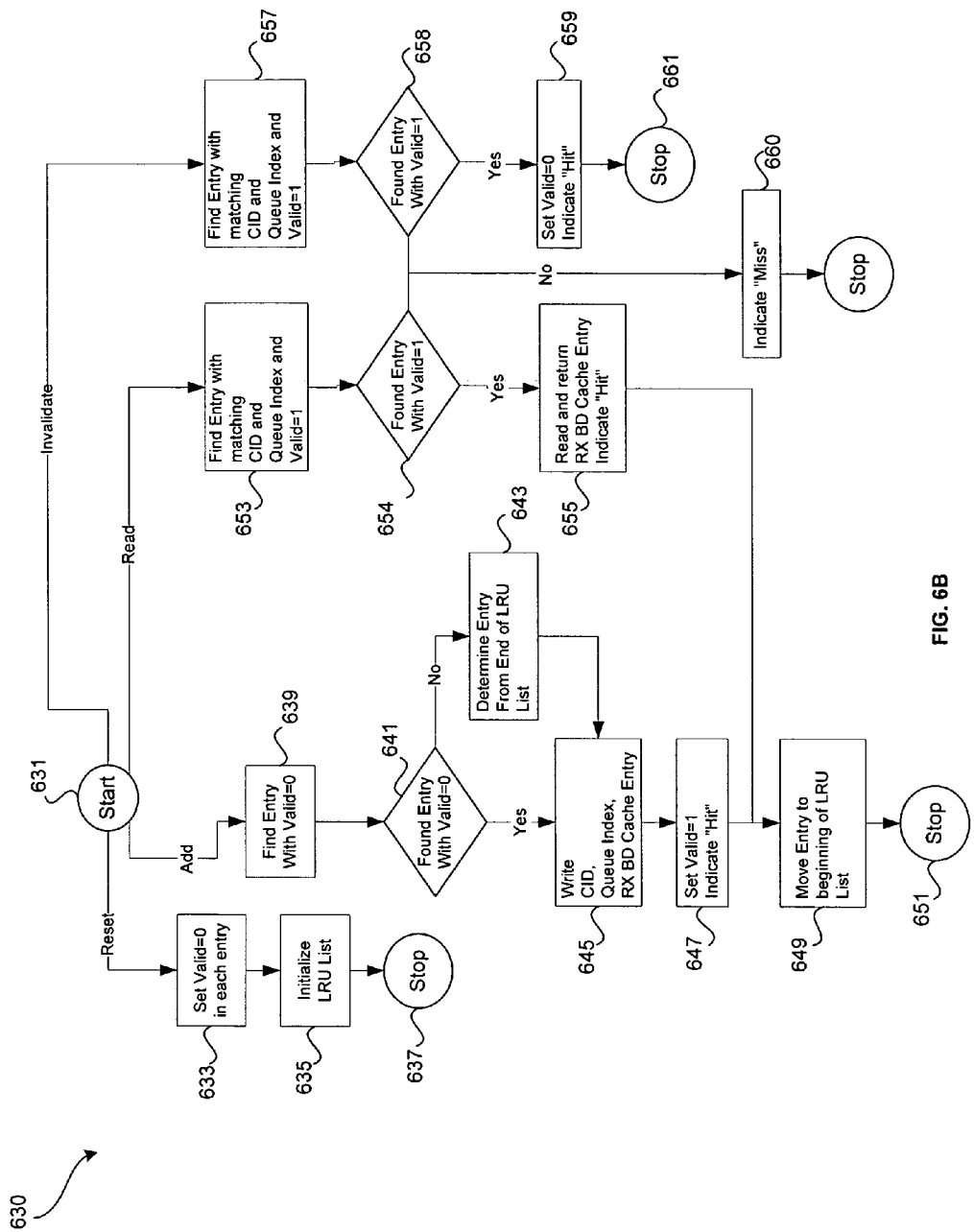
FIG. 6B is a flow diagram illustrating exemplary reset, add, read and invalidate operations for a transmit buffer descriptor cache entry that may be utilized for efficient buffer management for layer 2 (L2) through layer 5 (L5) network interface controller (NIC) applications, in accordance with an embodiment of the invention.

FIG. 6B is a flow diagram 630 illustrating exemplary reset, add, read and invalidate operations that may be utilized in conjunction with the RX buffer descriptor cache structure 600 of FIG. 6A, in accordance with an embodiment of the invention. Referring to FIG. 6B, the exemplary steps may start at step 631. With regard to an add operation, at step 639, a RX buffer descriptor cache structure may be searched for a cache entry with a valid bit equal to zero (0), indicating an available RX buffer descriptor cache entry field. At step 641, it is ascertained whether a cache entry with the valid bit equal to zero (0) was found. If such an entry was not found, then at step 643, an LRU logic may be utilized in order to free the cache entry from the end of the LRU list as the least recently used entry. At step 645, after a cache entry is found, or freed by the LRU logic, the memory buffer data may be loaded into the RX buffer descriptor cache entry, and the CID value and the queue index value may also be recorded. Since the cache entry field is now valid, the valid value may be set to one (1) at step 647, indicating an unavailable RX buffer descriptor cache entry field. At step 649, the entry may be moved to the beginning of the LRU list of the least recently used entries, since it was most recently used. The exemplary steps end at step 651.

Referring again to FIG. 6B, the exemplary steps with regard to a read operation, may start at step 631. At step 653, a RX buffer descriptor cache structure may be searched for a cache entry with a matching CID value, queue index value, and a valid bit equal to one (1), indicating an unavailable RX buffer descriptor cache entry field. At 654 it may be determined whether a valid entry bit equal to one (1) is located. If there is such a match, the specific matching RX buffer descriptor cache entry value is read and returned as an output at step 655 in addition to a "hit" indication. At step 649, the entry may be moved to the beginning of the LRU list of the least recently used entries, since it was most recently used. If the entry is not found, then a "miss" may be indicated at 660. The exemplary steps end at step 651.

The exemplary steps with regard to an invalidate operation, may start at step 631. At step 657, a RX buffer descriptor cache structure may be searched for a cache entry with a matching CID value, queue index value, and a valid bit equal to one (1), indicating an valid RX buffer descriptor cache entry field. At 654 it may be determined whether a valid entry bit equal to one (1) is located. If there is such a match, the specific matching RX buffer descriptor cache entry value is invalidated at step 659 by setting the valid bit to equal zero (0), indicating an available RX buffer descriptor cache entry field. If the entry is not found, then a "miss" may be indicated at 660. The exemplary steps end at step 651.

The exemplary steps with regard to a reset operation, may start at step 631. At step 633, a reset may be performed by setting the valid bit to equal zero (0) in each entry, which indicates an available RX buffer descriptor cache entry field. In addition, the LRU list with the least recently used entries may be initialized at step 635. The exemplary steps end at step 637.

The buffer descriptor cache entry for the different protocol levels may utilize a different format even though each cache entry consumes the same memory location in the cache. It is also possible to consume multiple cache entries for larger L5 cache data entries. For L2 connections, a buffer descriptor cache entry may comprise, for example, the following information: (1) a pointer to the physical buffer in the host memory; (2) a length of physical buffer in host memory; and (3) the number of buffer descriptors utilized to describe a singe packet that is to be encoded. This may be done with a bit that indicates the next buffer descriptor is a part of the same packet or start/end flag bit scheme or a buffer descriptor-per-packet field or other methods. In another aspect of the invention, common L2 features may require special additional fields. VLAN tag value and flag may be required, for example, in order to indicate that VLAN tag is to be inserted into the packet. Flags and offsets may be required, for example, to support TCP or UDP checksum calculation and insertion. Flags, offsets, and MSS value may be required, for example, to support TCP or UDP segmentation of the L2 packet. Other flags for optional processing of the L2 frame may also be required.

For L4 connections, a buffer descriptor cache entry may comprise exemplary parameter values, such as a pointer to physical buffer in host memory; length of physical buffer in host memory; and the number of buffer descriptors used to describe one application buffer. In accordance with an embodiment of the invention, one or more control bits may indicate whether the next buffer descriptor is part of the same application buffer or start/end flag bits scheme or a buffer descriptor-per-buffer field or other methods. A push indication bit may be utilized for the buffer descriptor or other special flags for L4 buffer processing.

For L5 connections, a buffer descriptor cache entry may comprise exemplary parameters such as a pointer to physical system memory page; one or more bits which indicates system memory page size or block size; and various other bits which may indicate an associated permission for memory address by lower TPT entry. The L5 buffer descriptor cache entry may also include upper TPT items, such as a host virtual address, a host virtual buffer length, virtual buffer permissions, and/or other L5 buffer and connection tracking information.

Conventional systems do not combine all these levels of offload in a single device and utilize different buffer descriptor storage methods for L2, L4, and L5 than the method provided by the invention. For L2 processing, conventional systems normally read buffer descriptors into a dedicated FIFO structure where the buffers descriptor is stored until consumed by transmit or receive data. Once consumed, the top entries are freed and more buffers are automatically read to prepare for more traffic. In this regard, buffer descriptors are still stored on the host according to the present invention, but are read only once under all circumstances. For L4 processing, conventional systems may utilize the same technique as for L2, or they may store all buffer descriptors in the NIC for all connections. For L5 processing, conventional systems store all buffer description information in the NIC using the upper/lower TPT entry system. However, the present invention stores such information for only the connections that have active traffic, regardless of weather they are L2, L4, or L5 type of connections.

For L5 processing, conventional systems must move all upper and lower TPT entry information onto the NIC before allowing the next operation to commence or must some how block operations that use the upper/lower TPT information until all associated data has completely been transferred onto the NIC. The invention only needs to acquire the location of the upper and lower TPT tables on chip before allowing subsequent operations. While conventional systems utilize separate structures to handle buffer descriptor storage for the different protocol types, the invention utilizes the same memory for all the protocols. Accordingly, the invention may provide a mechanism that may be adapted to identify a format of each entry in the buffer descriptor storage. This may be achieved in one of several ways in accordance with the invention. For example, utilizing a connection ID range, a value utilized to identify the connection may be used indirectly, or by using ranges, to identify the format for the stored data. The encoding of dedicated bits within the cache record or address may be utilized to identify the connection type.

In accordance with the various embodiments of the invention, when compared to conventional packet processing systems, the invention may store less data in the NIC system, leaving the data in host memory until traffic of a specific type needs service. Only the information needed to track where the buffer information is located on the host is needed on chip at all times. This information may be cached from off-chip memory or from host memory. Since the NIC may transmit and receive one packet at a time, only a predictable, sustainable flow of buffer information needs to be read from the host. Pipeline techniques may be used to maintain throughput while buffer information data is fetched from the host. Since the NIC may transmit and receive one packet at a time, the same memory may be utilized to buffer L2, L4, and L5 information depending on the type of traffic and its associated connection type. As traffic mix changes, so does the mix of types of information in the NIC memory or cache(s). In addition, the invention may provide for repartitioning of the cache. Both TX and RX descriptors may be held in a single cache without affecting the invention. The TX and/or RX caches may be segregated into different caches such that portions of the buffer descriptor information may be cached in separate caches. The TX and/or RX caches may be combined with caches for connection information, upper TPT information, etc. Upper TPT entry information may be combined in the TX and/or RX cache, or it may be held in a separate cache. Any particular cache may store different numbers of entries depending on the type of connection. This may be due to size differences between the cache entry elements for different connections.

The invention provides a reduction in needed storage, which drastically reduces the amount of memory needed in a NIC implementation for a device that supports L2, L4, and L5 traffic simultaneously. The reduction in required storage in accordance with various embodiments of the invention, allows packet processing solutions be priced competitively with L2-only solutions yet still provide L4 and L5 offload capabilities. These offload capabilities drastically reduce host processing overhead and latency penalties currently suffered by conventional network applications using L2-only solutions.

For L5 connections, the invention allows the bandwidth required to move the bulk of upper and lower TPT entries on-chip to be postponed and spread over a longer time period. This decreases latency in the command path for complete L5 operations and therefore increases performance. For example, prior-art would have to move a complete lower TPT entry on chip. For example, for a 10 Mbyte area, this Lower TPT entry may typically be about 20 Kbytes long. Using, for example, a 133 Mhz, 64-bit PCIX bus, transfer of the 20 Kbytes of data would take about 17 microseconds. However, in accordance with the various embodiments of the invention, only one 8 byte pointer in the lower TPT entry needs to be transferred before an operation can begin. Later when traffic uses additional portions of the lower TPT entry, it will be moved to the chip in smaller 8 to 32 byte chunks, in a pipeline manner, causing the controlled, smaller delay.

While the present invention utilizes virtual memory addressing of physical memory, the invention is not limited in this way. Other memory management schemes, such as a block based system, may be utilized. Such memory management schemes may be mutually substituted and/or supported independently of each other on a single NIC and/or on a buffer-by-buffer basis.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A method for buffer management for layer 2 (L2), layer 4(L4) and layer 5(L5) network interface controller (NIC) applications, the method comprising:
   caching, in a shared cache within a single NIC, buffer descriptors which are associated with L2 type, L4 type and L5 type active NIC connections;
   determining, by said single NIC, whether at least one active NIC connection is one of said L2 type, said L4 type, or said L5 type; and
   caching, using said shared cache, at least one buffer descriptor managed by the NIC applications, wherein the at least one buffer descriptor being associated with the determined type of the at least one active NIC connection.

2. The method according to claim 1, wherein the cached at least one buffer descriptor comprises:
   if the at least one active NIC connection is of the L2 or L4 type:
   at least one of a receive (RX) buffer descriptor and a transmit (TX) buffer descriptor; and
   if the at least one active NIC connection is of the L5 type:
   at least one of a upper translation page table (TPT) entry and a lower TPT entry.

3. The method according to claim 2, comprising:
   if the at least one active NIC connection is of the L2 or L4 type:
   associating at least one memory page in a host memory with at least one of the RX buffer descriptor and the TX buffer descriptor; and
   if the at least one active NIC connection is of the L5 type:
   associating at least one memory page in a host memory with the at least one lower TPT entry.

4. The method according to claim 3, comprising:
   if the at least one active NIC connection is of the L2 or L4 type:
   caching the at least one RX buffer descriptor in at least one RX buffer descriptor queue in the host memory;
   caching the at least one TX buffer descriptor in at least one TX buffer descriptor queue in the host memory; and
   if the at least one active NIC connection is of the L5 type:
   caching at least one lower TPT entry in a lower translation page table in the host memory.

5. The method according to claim 1, comprising:
   caching utilizing said shared cache, the at least one buffer descriptor in a shared cache entry on the single NIC, the shared cache entry adapted to cache at least one of a L2, L4 or L5 type buffer descriptor.

6. The method according to claim 2, wherein each of the at least one upper translation page table entry refers to at least one lower translation page table entry.

7. The method according to claim 2, wherein each of the at least one upper translation page table entry comprises at least one of a buffer length information and a starting virtual address information.

8. The method according to claim 2, wherein each of the at least one lower translation page table entry comprises at least a memory page identifier of a particular host memory page.

9. The method according to claim 2, wherein caching of the TX buffer descriptor comprises determining whether a cache entry is free.

10. The method according to claim 9, comprising:
    determining whether at least one control bit identifying whether the cache entry is free is asserted.

11. The method according to claim 10, wherein the at least one control bit is a free bit.

12. The method according to claim 2, wherein caching of at least one of the TX buffer descriptor and the RX buffer descriptor comprises determining an identifier of the at least one active NIC connection.

13. The method according to claim 12, wherein the determined identifier is a connection ID value.

14. The method according to claim 2, wherein caching of the TX buffer descriptor comprises:
    if the at least one active NIC connection is a L2 type:
    determining a queue location in a host memory, which is being associated with a TX buffer descriptor queue;
    if the at least one active NIC connection is a L4 type:
    determining a queue location in the host memory, which is being associated with a TX buffer descriptor queue; and
    if the at least one active NIC connection is a L5 type:
    determining an offset into a lower translation page table entry, the offset being associated with a TX buffer descriptor information.

15. The method according to claim 2, wherein caching of the RX buffer descriptor comprises:
- if the at least one active NIC connection is a L2 type:
- determining a queue location in a host memory, which is being associated with an RX buffer descriptor queue; and
- if the at least one active NIC connection is a L4 type:
- determining a queue location in the host memory, which is being associated with an RX buffer descriptor queue; and
- if the at least one active NIC connection is a L5 type:
- determining an offset into a lower translation page table entry, the offset being associated with an RX buffer descriptor information.

16. The method according to claim 1, comprising utilizing at least one of a least recently used (LRU) logic scheme, a Content Addressable Memory (CAM) address translation scheme, and a directed replacement scheme during buffer management of the at least one buffer descriptor cached within the NIC.

17. The method according to claim 1, wherein said determining comprises determining that a first active NIC connection is of the L2 type, and
- determining that a second active NIC connection is of the L4 type; and
- said caching comprises caching in the shared cache of the single NIC at least one first buffer descriptor associated with the first active NIC connection, and caching in the shared cache of the single NIC at least one second buffer descriptor associated with the second active NIC connection.

18. The method according to claim 1, wherein said determining comprises determining that a first active NIC connection is of the L2 type, and determining that a second active NIC connection is of the L5 type; and
- said caching comprises caching in the shared cache of the single NIC at least one first buffer descriptor associated with the first active NIC connection, and caching in the shared cache of the single NIC at least one second buffer descriptor associated with the second active NIC connection.

19. The method according to claim 1, wherein said determining comprises determining that a first active NIC connection is of the L4 type, and determining that a second active NIC connection is of the L5 type; and
- said caching comprises caching in the shared cache of the single NIC at least one first buffer descriptor associated with the first active NIC connection, and caching in the shared cache of the single NIC at least one second buffer descriptor associated with the second active NIC connection.

20. The method according to claim 1, wherein said determining comprises determining that a first active NIC connection is of the L2 type, determining that a second active NIC connection is of the L4 type, and determining that a third active NIC connection is of the L5 type; and
- said caching comprises caching in the shared cache of the single NIC at least one first buffer descriptor associated with the first active NIC connection, caching in the shared cache of the single NIC at least one second buffer descriptor associated with the second active NIC connection, and caching in the shared cache of the single NIC at least one third buffer descriptor associated with the third active NIC connection.

21. A system for buffer management for layer 2 (L2), layer 4 (L4) and layer 5 (L5) network interface controller (NIC) applications, comprising:
- a single NIC comprising a shared cache for caching buffer descriptors which are associated with L2 type, L4 type and L5 type active NIC connections;
- at least one processor within said single network interface controller (NIC) determines whether at least one active NIC connection is one of said L2 type, said L4 type, or said L5 type; and
- the at least one processor caches, using said shared cache, at least one buffer descriptor managed by the NIC applications, wherein the at least one buffer descriptor being associated with the determined type of the at least one active NIC connection.

22. The system according to claim 21, wherein the cached at least one buffer descriptor comprises at least one of a receive (RX) buffer descriptor, a transmit (TX) buffer descriptor, a upper translation page table (TPT) entry, and a lower TPT table entry.

23. The system according to claim 22, wherein the at least one processor associates at least one memory page in a host memory with at least one of the RX buffer descriptor, the TX buffer descriptor, and the lower TPT table entry.

24. The system according to claim 23, the at least one processor:
- caching the RX buffer descriptor in at least one RX buffer descriptor queue in the host memory, if the at least one active NIC connection is of the L2 or L4 type;
- caching the TX buffer descriptor in at least one TX buffer descriptor queue in the host memory, if the at least one active NIC connection is of the L2 or L4 type; and
- caching at least one lower TPT entry in a lower translation page table in the host memory, if the at least one active NIC connection is of the L5 type.

25. The system according to claim 21, wherein the at least one processor utilizes said shared cache, caches the at least one buffer descriptor in a shared cache entry on the single NIC, the shared cache entry adapted to cache at least one of a L2, L4 or L5 type buffer descriptor.

26. The system according to claim 22, wherein each of the at least one upper translation page table entry refers to at least one lower translation page table entry.

27. The system according to claim 22, wherein each of the at least one upper translation page table entry comprises at least one of a buffer length information and a starting virtual address information.

28. The system according to claim 22, wherein each of the at least one lower translation page table entry comprises at least a memory page identifier of a particular host memory page.

29. The system according to claim 22, wherein caching of the TX buffer descriptor by the at least one processor comprises the at least one processor determining whether a cache entry is free.

30. The system according to claim 29, wherein the at least one processor determines whether at least one control bit identifying whether the cache entry is free is asserted.

31. The system according to claim 30, wherein the at least one control bit is a free bit.

32. The system according to claim 22, wherein caching of at least one of the TX buffer descriptor and the RX buffer descriptor by the at least one processor further comprises the at least one processor determining an identifier of the at least one active NIC connection.

33. The system according to claim 32, wherein the determined identifier is a connection ID value.

34. The system according to claim 22, wherein caching of the TX buffer descriptor by the at least one processor comprises:

if the at least one active NIC connection is a L2 type:
the at least one processor determining a queue location in a host memory, which is being associated with a TX buffer descriptor queue;
if the at least one active NIC connection is a L4 type:
the at least one processor determining a queue location in the host memory, which is being associated with a TX buffer descriptor queue; and
if the at least one active NIC connection is a L5 type:
the at least one processor determining an offset into a lower translation page table entry, the offset being associated with a TX buffer descriptor information.

35. The system according to claim 22, wherein caching of the RX buffer descriptor by the at least one processor comprises:
if the at least one active NIC connection is a L2 type:
the at least one processor determining a queue location in a host memory, which is being associated with an RX buffer descriptor queue;
if the at least one active NIC connection is a L4 type:
the at least one processor determining a queue location in the host memory, which is being associated with an RX buffer descriptor queue; and
if the at least one active NIC connection is a L5 type:
the at least one processor determining an offset into a lower translation page table entry, the offset being associated with an RX buffer descriptor information.

36. The system according to claim 21, wherein the at least one processor utilizes at least one of a least recently used (LRU) logic scheme, a Content Addressable Memory (CAM) address translation scheme, and a direct replacement scheme during buffer management of the at least one buffer descriptor cached within the single NIC.

37. The system according to claim 21, wherein the at least one processor:
determines that a first active NIC connection is of the L2 type;
determines that a second active NIC connection is of the L4 type;
caches in the shared cache of the single NIC at least one first buffer descriptor associated with the first active NIC connection; and
caches in the shared cache of the single NIC at least one second buffer descriptor associated with the second active NIC connection.

38. The system according to claim 21, wherein the at least one processor determines that a first active NIC connection is of the L2 type, determines that a second active NIC connection is of the L5 type, caches in the shared cache of the single NIC at least one first buffer descriptor associated with the first active NIC connection, and caches in the shared cache of the single NIC at least one second buffer descriptor associated with the second active NIC connection.

39. The system according to claim 21, wherein the at least one processor:
determines that a first active NIC connection is of the L4 type;
determines that a second active NIC connection is of the L5 type;
caches in the shared cache of the single NIC at least one first buffer descriptor associated with the first active NIC connection; and
caches in the shared cache of the single NIC at least one second buffer descriptor associated with the second active NIC connection.

40. The system according to claim 21, wherein the at least one processor:
determines that a first active NIC connection is of the L2 type;
determines that a second active NIC connection is of the L4 type;
determines that a third active NIC connection is of the L5 type;
caches in the shared cache of the single NIC at least one first buffer descriptor associated with the first active NIC connection, caches in the shared cache of the single NIC at least one second buffer descriptor associated with the second active NIC connection; and
caches in the shared cache of the single NIC at least one third buffer descriptor associated with the third active NIC connection.

41. A method for buffer management for layer 2 (L2), layer 4 (L4) and layer 5 (L5) network interface controller (NIC) applications, the method comprising:
caching, in a shared cache within a single NIC, buffer descriptors which are associated with L2 type, L4 type and L5 type active NIC connections;
determining, by the single NIC, whether at least one active NIC connection is one of said L2 type, said L4 type, or said L5 type; and
handling, using said buffer descriptors in said shared cache, data associated with the L2 type, L4 type and L5 type NIC connection. of the single NIC at least one second buffer descriptor associated with the second active NIC connection.

* * * * *

UNITED STATES PATENT AND TRADEMARK OFFICE
CERTIFICATE OF CORRECTION

| | |
|---|---|
| PATENT NO. | : 8,161,197 B2 |
| APPLICATION NO. | : 10/971186 |
| DATED | : April 17, 2012 |
| INVENTOR(S) | : McDaniel et al. |

It is certified that error appears in the above-identified patent and that said Letters Patent is hereby corrected as shown below:

Column 22, lines 45, 46 and 47, remove "of the single NIC at least one second buffer descriptor associated with the second active NIC connection."

Signed and Sealed this
Nineteenth Day of June, 2012

David J. Kappos
*Director of the United States Patent and Trademark Office*